US012680953B2

(12) United States Patent 
Ono et al.

(10) Patent No.: US 12,680,953 B2 
(45) Date of Patent: Jul. 14, 2026

(54) FAR-INFRARED SPECTROSCOPIC DEVICE, AND FAR-INFRARED SPECTROSCOPIC METHOD

(71) Applicant: Hitachi High-Tech Corporation, Tokyo (JP)

(72) Inventors: Touya Ono, Tokyo (JP); Kei Shimura, Tokyo (JP); Mizuki Mohara, Tokyo (JP); Kenji Aiko, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 239 days.

(21) Appl. No.: 18/715,933

(22) PCT Filed: Dec. 10, 2021

(86) PCT No.: PCT/JP2021/045558 
§ 371 (c)(1), 
(2) Date: Jun. 3, 2024

(87) PCT Pub. No.: WO2023/105758 
PCT Pub. Date: Jun. 15, 2023

(65) Prior Publication Data 
US 2025/0035547 A1 Jan. 30, 2025

(51) Int. Cl. 
*G01N 21/3586* (2014.01) 
*G01N 21/3554* (2014.01) 
*G01N 21/359* (2014.01)

(52) U.S. Cl. 
CPC ..... *G01N 21/3586* (2013.01); *G01N 21/3554* (2013.01); *G01N 21/359* (2013.01); 
(Continued)

(58) Field of Classification Search 
CPC ........... G01N 21/3554; G01N 21/3586; G01N 21/359; G01N 2201/0238; G01N 2201/1214 
See application file for complete search history.

(56) References Cited

U.S. PATENT DOCUMENTS 12,196,670 B2 * 1/2025 Ono .................. G01N 21/3581 
2007/0246653 A1 10/2007 Zhou 
(Continued)

FOREIGN PATENT DOCUMENTS

EP 2 042 855 A1 4/2009 
JP 2009-534659 A 9/2009 
(Continued)

OTHER PUBLICATIONS

International Search Report (PCT/ISA/210) issued in PCT Application No. PCT/JP2021/045558 dated Feb. 22, 2022 with English translation (4 pages). 
(Continued)

*Primary Examiner* — Jurie Yun 
(74) *Attorney, Agent, or Firm* — Crowell & Moring LLP

(57) ABSTRACT

This far-infrared analyzing device comprises: a holding mechanism configured to be capable of holding specimen in moist air; a detector for detecting light obtained by emitting a far-infrared light beam onto the specimen; and a signal processing unit for computing an absorption spectrum of the specimen from a signal from the detector. The signal processing unit acquires: a first spectrum detected by the detector when the far-infrared light beam is emitted along measurement optical path while the wavelength of the far-infrared light beam is changed, without the specimen being on the measurement optical path; and a second spectrum detected by the detector when the far-infrared light beam is emitted along the measurement optical path while the wavelength of the far-infrared light beam is changed, with the specimen on the measurement optical path. Then, a difference between the spectrum signals is calculated at frequency intervals determined in accordance with an absorption peak due to water vapor, and the frequency of the absorption peak due to water vapor is selected in accordance 
(Continued)

with a comparison between the difference and a threshold. Data removal is performed for the spectrum signals on the basis of the selected frequency.

12 Claims, 17 Drawing Sheets

(52) U.S. Cl.
   CPC ................ *G01N 2201/0238* (2013.01); *G01N 2201/1214* (2013.01)

(56) References Cited

U.S. PATENT DOCUMENTS

| | | | |
|---|---|---|---|
| 2010/0099139 A1 | 4/2010 | Ben-David et al. | |
| 2017/0336260 A1 | 11/2017 | Fujihara et al. | |
| 2019/0302012 A1 | 10/2019 | Zheng et al. | |
| 2019/0369016 A1 | 12/2019 | Watanabe et al. | |

FOREIGN PATENT DOCUMENTS

| | | | |
|---|---|---|---|
| JP | WO2008/001785 | A1 | 11/2009 |
| JP | 2010-164511 | A | 7/2010 |
| JP | 2010-523970 | A | 7/2010 |
| JP | 2017-211369 | A | 11/2017 |
| WO | WO 2008/001785 | A1 | 1/2008 |
| WO | WO 2018/110481 | A1 | 6/2018 |

OTHER PUBLICATIONS

Japanese-language Written Opinion (PCT/ISA/237) issued in PCT Application No. PCT/JP2021/045558 dated Feb. 22, 2022 with English translation (6 pages).

* cited by examiner

Fig. 1A

Fig. 1B
$f_p$(pump light)                    $f_s$(signal light)
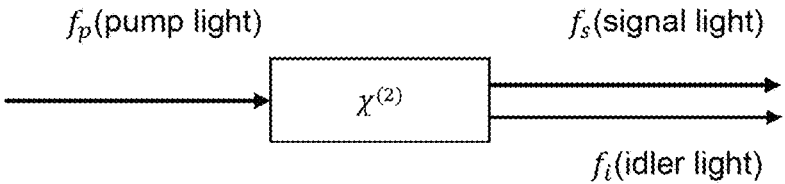
$f_i$(idler light)
Fig. 1C
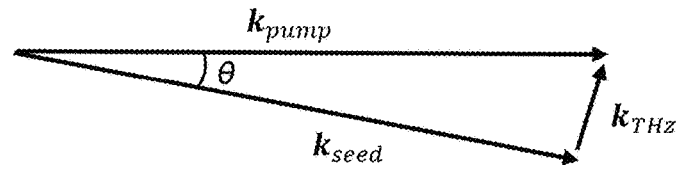
Fig. 1D
| Measurement frequency | Reference signal value | Specimen signal value | Noise signal value |
|---|---|---|---|
| $f_1$ | x1 | y1 | z1 |
| $f_2$ | x2 | y2 | z2 |
| ⋮ | ⋮ | ⋮ | ⋮ |
| | | | |
| $f_n$ | xn | yn | zn |

FAR-INFRARED SPECTROSCOPIC DEVICE, AND FAR-INFRARED SPECTROSCOPIC METHOD

TECHNICAL FIELD

The present invention relates to a far-infrared spectro-scopic spectroscopic apparatus and a far-infrared method.

BACKGROUND ART

Far-infrared light from 0.1 THz to 10 THz is also called a terahertz wave. This frequency band corresponds to the middle between a radio wave and light, and a terahertz wave has characteristics of both the straightness of light and high transparency. In addition, a terahertz wave has energy equivalent to an excitation width of a phonon mode, and thus an absorption peak derived from lattice vibration and inter-molecular vibration can be obtained.

Since the absorption peak can be observed at a frequency specific to a material, the absorption peak is used for non-destructive identification of the material. By applying the above features, the terahertz wave is expected to be used for industrial applications such as imaging technology and component quantitative analysis including inspection of hazardous materials and pharmaceutical products.

As one of terahertz spectroscopic methods, THz-time domain spectroscopy (THz-TDS) is known, which has been in practical use since the 1990s and has become popular since then. In this THz-TDS method, a time waveform of a wideband terahertz pulse is acquired using a femtolaser as a light source. An absorption spectrum can be obtained by performing fast Fourier transformation of the time wave-form.

In the field of pharmaceutical inspection, research and development of destructive and nondestructive testing of pharmaceutical products using infrared light, ultraviolet light, Raman scattering light, and terahertz waves is pro-gressing. In particular, research and development for enabling an in-line inspection method in which inspection is performed by installing a spectroscopic apparatus at a manu-facturing process is in progress, and expectation for terahertz spectroscopy enabling non-destructive inspection is increas-ing.

However, there are many absorption peaks due to water vapor in a terahertz band. In order to reduce this effect, it is necessary to fill an optical path with a gas such as dry air in ordinary terahertz spectroscopic measurement. This makes it difficult to put the in-line inspection of pharmaceutical products into practical use. In addition, such changes in humidity may also cause changes in crystalline shapes and properties of pharmaceutical products. Therefore, a spectro-scopic apparatus that can measure a specimen under a humid condition without using dry air is required.

As a method for enabling terahertz spectroscopic mea-surement under a humid condition, a method of smoothing by weighting each frequency using data from an existing database of positions of water vapor absorption peaks is known (patent document 1). However, with the method using the information in the existing database, it is difficult to correctly determine frequencies over a sufficient band-width due to a difference in characteristics between a method used to acquire the data from the database and a method used to actually measure the spectrum of a specimen. Without correct determination, it is not possible to reduce water vapor absorption peaks over a sufficient bandwidth only by threshold value adjustment, which constitutes a problem in obtaining practical performance.

CITATION LIST

Patent Literature

Patent Document 1: JP08/001785A1

SUMMARY OF INVENTION

Technical Problem

The present invention provides a far-infrared spectro-scopic apparatus and a far-infrared spectroscopic method that can accurately measure an absorption spectrum derived from a specimen by effectively reducing absorption peaks due to water vapor even in any moist air atmosphere with a small computing amount.

Solution to Problem

In order to solve the above-described problem, a far-infrared spectroscopic apparatus according to the invention includes: a holding mechanism configured to be capable of holding a specimen in moist air; a detector that detects light obtained by emitting far-infrared light onto the specimen; and a signal processing unit that computes an absorption spectrum of the specimen from a signal from the detector. The signal processing unit acquires: a first spectrum detected by the detector when the far-infrared light is emitted along a measurement optical path while the wavelength of the far-infrared light is changed, without the specimen being on the measurement optical path; and a second spectrum detected by the detector when the far-infrared light is emitted along the measurement optical path while the wave-length of the far-infrared light is changed, with the specimen being on the measurement optical path. Then, the signal processing unit calculates a difference in any of the first spectrum, the second spectrum, or a spectrum obtained based on the first spectrum and the second spectrum at frequency intervals determined in accordance with a width of absorption peaks due to water vapor, selects frequencies of absorption peaks due to water vapor in accordance with comparison between the difference and a threshold value, and executes data elimination for a signal of the first spectrum, the second spectrum, or the spectrum obtained based on the first spectrum and the second spectrum, based on the selected frequencies.

Advantageous Effects of Invention

According to the invention, it is possible to provide a far-infrared spectroscopic apparatus and a far-infrared spec-troscopic method that can accurately measure an absorption spectrum derived from a specimen by effectively reducing the influence of absorption peaks due to water vapor even in moist air atmosphere with a small computing amount.

BRIEF DESCRIPTION OF DRAWINGS

FIG. 1A is a schematic diagram illustrating a configura-tion of a far-infrared spectroscopic apparatus 100 according to a first embodiment.

FIG. 1B is a diagram illustrating parametric generation of signal light having a frequency fs and idler light having a frequency fi by making high-intensity pump light having a frequency fp incident on a non-linear optical crystal having a second-order no-linear susceptibility $\chi^{(2)}$.

FIG. 1C is a wave number vector diagram illustrating the momentum conservation law for generating terahertz waves using pump light and seed light.

FIG. 1D is a diagram illustrating a relationship between a measurement frequency f and a spectrum intensity value obtained at each frequency.

DESCRIPTION OF EMBODIMENTS

Figure 2A:
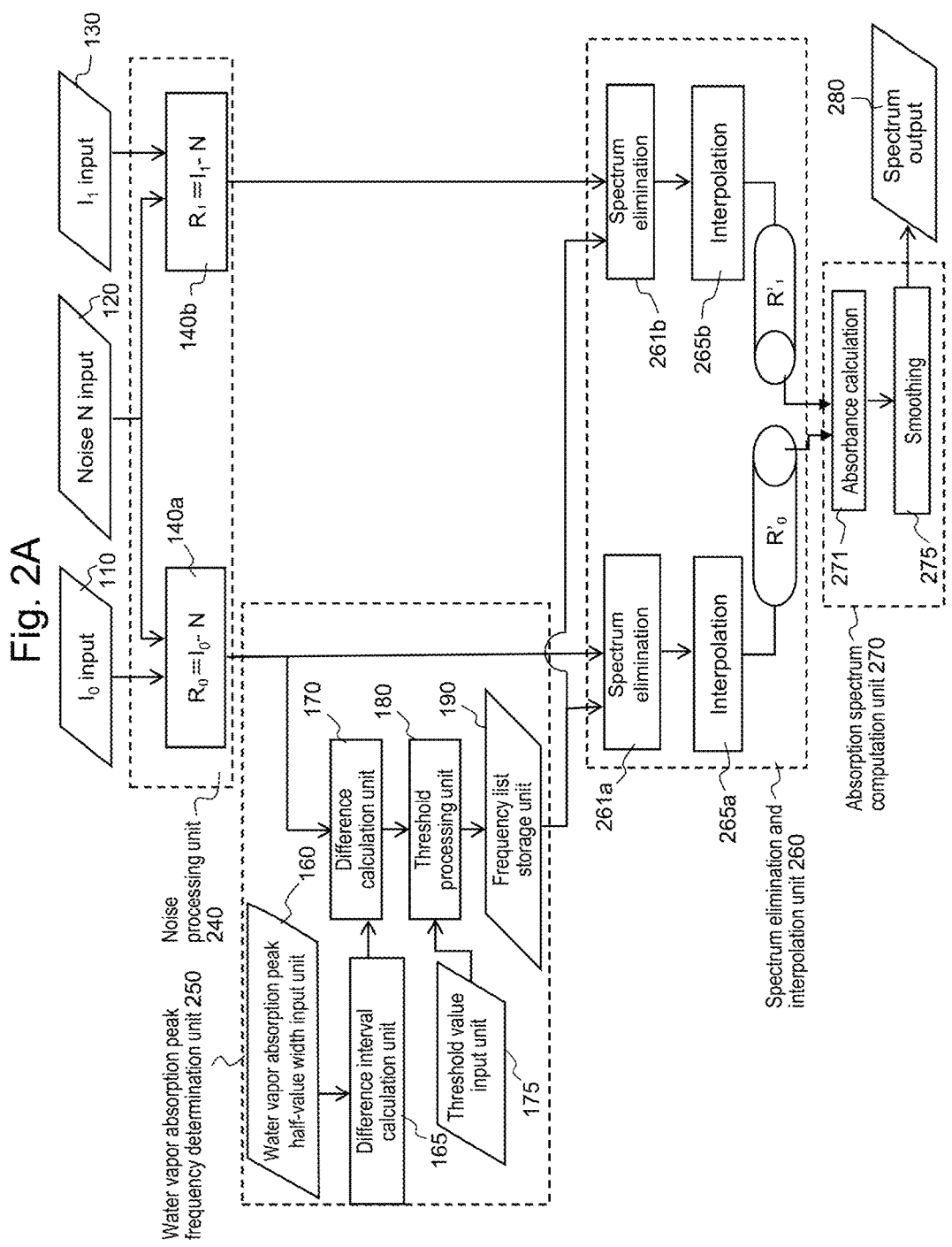
FIG. 2A is a diagram illustrating the details of a configuration of a spectrum processing unit 230.

Embodiments will be described below with reference to the accompanying drawings. In the accompanying drawings, elements that are functionally the same may be denoted by the same number. It should be noted that the accompanying drawings illustrate embodiments and implementation examples according to the principle of the present disclosure, but these are for understanding of the disclosure and are not used to interpret the disclosure in a limited manner. The description herein is merely a typical example and is not intended to limit the scope of claims or application examples of the disclosure in any sense.

The embodiments are described in detail enough for those skilled in the art to implement the disclosure. However, it should be understood that other implementations and forms are possible, and changes in configuration and structure and replacement of various elements are possible without departing from the scope and spirit of the technical idea of the disclosure. Therefore, the following description should not be construed as being limited thereto.

First Embodiment

Figure 1A:
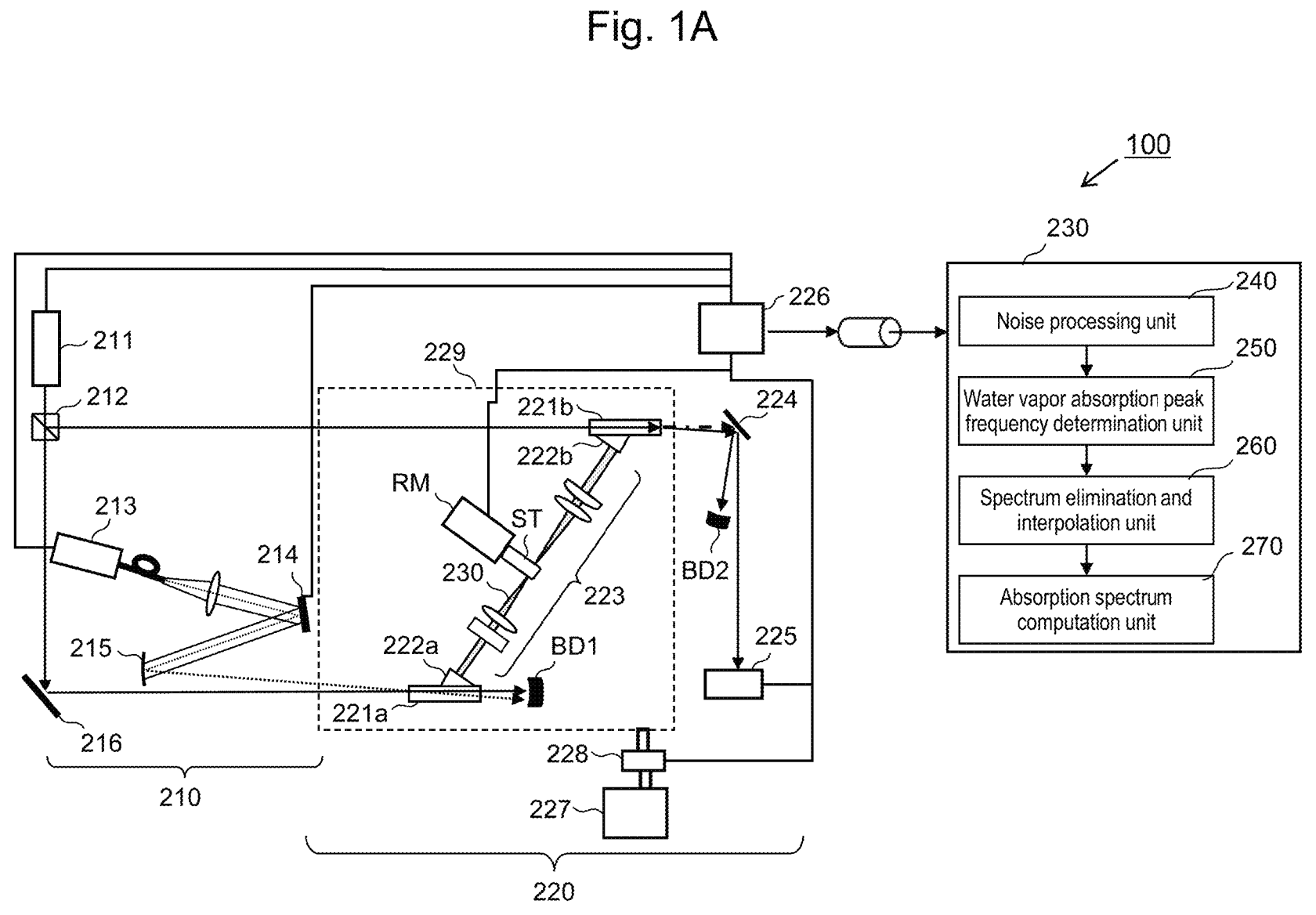

A configuration of a far-infrared spectroscopic apparatus 100 according to a first embodiment will be described with reference to FIG. 1A. As an example, the far-infrared spectroscopic apparatus 100 includes a light source unit 210, an optical system 220, and a spectrum processing unit 230 (signal processing unit). The spectrum processing unit 230 can be configured by a general computer that can perform various computations and a computer program for spectrum processing.

The light source unit 210 and the optical system 220 employ a terahertz light parametric method using an injection-seeded terahertz parametric generation (is-TPG) light source which is a method of generating high-intensity light (terahertz light in this embodiment) from two light beams having different wavelengths and a non-linear optical crystal. The is-TPG method is superior to the above-described TDS method in terms of peak power and wavelength resolution. Although the apparatus using the is-TPG light source will be described below as an example, the invention is also applicable to the TDS method.

The details of the light source unit 210 will be described with reference to FIG. 1A. As an example, the light source unit 210 is configured by a light source 211 as a pump light source, a polarization beam splitter 212, a light source 213 as a seed light source, optical elements 214 and 215, a mirror 216, and the like. The light source unit 210 (is-TPG light source unit) includes two light sources 211 and 213 that emit near-infrared light. The two light sources 211 and 213 emit near-infrared light having different wavelengths.

The light source 211 is a pump light source and, for example, a microchip laser can be used. The light emitted from the light source 211 (pump light) is split into two directions by the polarization beam splitter 212, and one of the light is guided to a non-linear optical crystal 221a via the mirror 216, and the other of the light is guided to a non-linear optical crystal 221b.

The light source 213 is a seed light source and, for example, a wavelength-tunable semiconductor laser can be used. The optical element 214 is a reflector whose angle can be controlled, and a galvanometer mirror can be used, for example. As the optical element 215, for example, a concave mirror can be used.

The light emitted from the light source 213 (seed light) is incident onto the non-linear optical crystal 221a via the optical elements 214 and 215. The incident seed light at this time is guided by the angle control of the optical element 214 at an angle that satisfies a phase matching angle (horizontal direction on the paper surface of the drawing) to be described below with respect to the pump light. At this time, an incident surface to the non-linear optical crystal 221*a* is in an imaging relationship with a surface of the optical element 214, and thus the irradiation position of the seed light on the incident surface of the non-linear optical crystal 221*a* does not change even when the angle of the optical element 214 is changed.

Next, the details of the optical system 220 will be described with reference to FIG. 1A. As an example, the optical system 220 includes a sealed chamber 229, a near-infrared light detector 225, a control unit 226, a dry air supply unit 227, and a dry air inflow control unit 228.

A terahertz light generation mechanism, which is formed by pressure-bonding the non-linear optical crystal 221*a* and an Si prism 222*a*, is installed in a specimen chamber configured by the sealed chamber 229. Terahertz light having an arbitrary wavelength is generated in the terahertz light generation mechanism from pump light incident onto the non-linear optical crystal 221*a* and wavelength-tunable seed light. A beam damper BD1 for shielding unnecessary light having passed the non-linear optical crystal 221*a* is installed in the vicinity of the non-linear optical crystal 221*a*.

An optical mechanism, which is formed by pressure-bonding the non-linear optical crystal 221*b* and an Si prism 222*b*, is also installed in the specimen chamber. The non-linear optical crystal 221*b* and the Si prism 222*b* may have the same mechanisms (structures) as the non-linear optical crystal 221*a* and the Si prism 222*a*, respectively, and serve as a generation source of detection light (near-infrared light). The light from the Si prism 222*a* is guided to the non-linear optical crystal 221*b* via the Si prism 222*b* by a light guiding optical system 223.

A specimen table ST and a movable stage RM for holding the specimen table ST are provided in the vicinity of the middle between the non-linear optical crystals 221*a* and 221*b* in the specimen chamber. A holding mechanism that holds a specimen in moist air (humid condition) is formed by the specimen table ST, the movable stage RM, and the specimen chamber. The specimen table ST and the movable stage RM are arranged such that a specimen loaded at the specimen table ST is inserted into and removed from an optical path of the terahertz light described above.

The principle of generation of terahertz light using a non-linear optical crystal will be described in detail with reference to FIGS. 1B and 1C. FIG. 1B is a diagram illustrating generation of signal light having a frequency fs and idler light having a frequency fi by non-linear polarization when high-intensity pump light having a frequency fp is made incident onto a non-linear optical crystal having a second-order non-linear susceptibility $\chi^{(2)}(\neq 0)$. At this time, when light having a frequency fs is made incident simultaneously with the pump light, light having a frequency fi can be amplified (this is also true when fs and fi are interchanged), which is called parametric amplification.

Pump light and seed light are made incident onto a non-linear optical crystal in a non-coaxial manner, so that a terahertz wave is generated and amplified by the parametric amplification described above. When the frequency of terahertz light to be generated is defined as fTHz, a frequency fpump of pump light and a frequency fseed of seed light are determined so as to satisfy [Math. 1] below. In addition, regarding an angle formed by the optical axis of the pump light and the optical axis of the seed light which are non-coaxially incident, when a wave number vector of the pump light is represented by→kpump and a wave number vector of the seed light is represented by→kseed, a wave number vector→kTHz of the terahertz wave to be generated is determined so as to satisfy [Math. 2] below.

$$fpump - fseed = f \text{ THz} \qquad \text{[Math. 1]}$$

$$\rightarrow kpump - \rightarrow kseed = \rightarrow k \text{ THz} \qquad \text{[Math. 2]}$$

In FIG. 1A, parametric generation of terahertz light is possible by using the light from the light source 211 and the light from the seed light source 213 that are made incident onto the non-linear optical crystal 221*a* such that [Math. 1] and [Math. 2] described above are satisfied at the same time.

Detection light is also generated at the non-linear optical crystal 221*b* in FIG. 1A in the same principle as the terahertz light described above. Near-infrared light is parametrically generated at the non-linear optical crystal 221*b* by using terahertz light generated from the non-linear optical crystal 221*a* and pump light from the polarization beam splitter 212. The resulting near-infrared light is detection light that is incident on the near-infrared light detector 225.

The terahertz light having transmitted through the specimen placed on the specimen table ST is incident onto the non-linear optical crystal 221*b* together with the pump light from the polarization beam splitter 212 so as to generate the above-described near-infrared light. This near-infrared light is guided to the near-infrared light detector 225 as detection light, and the intensity of the detection light is obtained as a detection signal value.

In acquiring an absorption spectrum of the specimen, detection signal values are sequentially acquired while the frequency f of measurement light is changed to a plurality of values from a measurement start frequency $f_1$ [THz] to a measurement end frequency $f_n$ [THz] at a predetermined frequency interval $\Delta$.

The relationship of the acquired signal values is shown in FIG. 1D. After the frequency f of the measurement light is set to the measurement start frequency $f_1$, a detection signal value (reference signal value) x1 is first acquired in a state where no specimen is present on a terahertz optical path. Next, the movable stage RM of the specimen is moved so as to arrange the specimen on the terahertz optical path (the specimen table ST), and then a detection signal value (a signal value of the specimen) y1 is acquired. In the case of measuring a plurality of specimens at the same time, the detection signal value of the next specimen is subsequently acquired. Further, the terahertz optical path (measurement optical path) is shielded by a shielding portion (not illustrated), and a detection signal value z1 as a noise signal value is acquired in sequence.

Thereafter, in the same way as described above, after the frequency f of the measurement light is set to $f_2$, detection signal values are acquired in the order of a reference signal value x2, a signal value y2 of the specimen, and a noise signal value z2. This is repeated n times until the measurement end frequency $f_n$ so as to acquire a reference signal value xi, a signal value yi of the specimen, and a noise signal value zi (i=1 to n) at each frequency. As shown in [Math. 3], "n" indicates the number of acquired data of detection signal values and is determined by the measurement start frequency $f_1$, the measurement end frequency $f_n$, and the frequency interval $\Delta$ for measurement.

$$n = 1 + (fn - f_1)/\Delta \qquad \text{[Math. 3]}$$

With respect to a series of detection signal sequences (n-order vector data) obtained as above, a sequence of signals xi acquired in a state where no specimen is present on the terahertz optical path is defined as a reference spectrum $(x_1, x_2, \ldots, x_n)$. A sequence of signal values yi acquired via the specimen is defined as a specimen spectrum $(y_1, y_2, \ldots, y_n)$. A sequence of signal values zi acquired by shielding the terahertz optical path is defined as a noise spectrum $(n_1, n_2, \ldots, n_n)$.

There is light generated from the non-linear optical crystal 221b resulting from only the pump light. The influence of such light generated without depending on the terahertz light in the non-linear optical crystal 221 is included in the noise spectrum.

The reference spectrum, the specimen spectrum, and the noise spectrum are stored in the control unit 226 and transmitted to the spectrum processing unit 230. Operations of the pump light source 211, the light source (the seed light source) 213, the optical element (galvanometer mirror) 214, the movable stage RM, the detector 225, the dry air inflow control unit 228 can be controlled by the control unit 226.

In the spectrum processing unit 230, an absorption spectrum of the specimen is calculated based on the reference spectrum, the specimen spectrum, and the noise spectrum. The absorption spectrum can be calculated by comparing the specimen spectrum with the reference spectrum to determine how much the specimen spectrum has been attenuated at which wavelength. It should be noted that the far-infrared spectroscopic apparatus of the embodiment is configured to detect terahertz light transmitted through a specimen, but can also be configured to detect reflected light.

A configuration of the spectrum processing unit 230 is illustrated in FIG. 2A. Specifically, the spectrum processing unit 230 includes a noise processing unit 240, a water vapor absorption peak frequency determination unit 250, a spectrum elimination and interpolation unit 260, and an absorption spectrum computation unit 270. As illustrated in FIG. 2A, the water vapor absorption peak frequency determination unit 250 further includes a water vapor absorption peak half-value width input unit 160, a difference interval calculation unit 165, a difference calculation unit 170, a threshold processing unit 180, and a frequency list storage unit 190. The spectrum elimination and interpolation unit 260 includes spectrum elimination units 261a and 261b and interpolation units 265a and 265b. Processing by each unit will be described.

The noise processing unit 240 has a function of acquiring a spectrum on which threshold processing can be performed by subtracting the noise spectrum from each of the reference spectrum and the specimen spectrum (blocks 140a and 140b).

The water vapor absorption peak frequency determination unit 250 has a function of determining a frequency at which the influence of a water vapor absorption peak is caused by calculating a difference between two spectrum intensity values $x_j$ and $x_k$ of the reference spectrum, and performing the threshold processing with a threshold value t.

The spectrum elimination and interpolation unit 260 has a function of eliminating the spectrum at the frequency extracted by a water vapor absorption peak frequency determination unit 250a from the output from the noise processing unit 240 with the spectrum elimination units 261a and 261b, and performing interpolation processing in the interpolation units 265a and 265b.

The absorption spectrum computation unit 270 has a function of computing an absorption spectrum based on the reference spectrum and the specimen spectrum on which spectrum elimination and interpolation processing has been performed by the spectrum elimination and interpolation unit 260.

The dry air supply unit 227 is connected to the sealed chamber 229 and supplies dry air to the interior of the sealed chamber 229. The inflow of dry air is controlled by the dry air inflow control unit 228, whereby the sealed chamber can be kept in humid to dry conditions.

A detailed configuration of the spectrum processing unit 230 and a procedure to output an absorption spectrum derived from a specimen under a humid condition will be described with reference to FIG. 2A.

A reference spectrum, a specimen spectrum, and a noise spectrum are acquired while sequentially switching the measurement frequency f to the measurement start frequency $f_1$ [THz], the measurement end frequency $f_n$ [THz], and frequencies determined by the frequency interval $\Delta$ [THz] ($f=(f_1, f_2, \ldots, f_n)$). That is, a reference spectrum $I_0=(x_1, x_2, \ldots, x_n)$ obtained in a state where no specimen is present on the terahertz optical path is regarded as 110, and a noise spectrum $N=(n_1, n_2, \ldots, n_n)$ obtained by performing a measurement in a state where the terahertz optical path is shielded is regarded as 120, and each of 110 and 120 is input to the noise processing unit 240. In addition, a specimen spectrum $I_1=(y_1, y_2, \ldots, y_n)$ obtained by placing a specimen on the terahertz optical path and causing terahertz light to transmit through or to be reflected at the specimen is regarded as 130 and input to the noise processing unit 240.

The noise processing unit 240 subtracts the noise spectrum N from each of the reference spectrum $I_0$ and the specimen spectrum $I_1$ in the blocks 140a and 140b so as to obtain spectra $R_0=(r_1, r_2, \ldots, r_n)$ and $r_1=(r'_1, r'_2, \ldots, r'_n)$ as shown in [Math. 4] and [Math. 5].

$$r_k = x_k - n_k \qquad \text{[Math. 4]}$$

$$r'_k = y_k - n_k \qquad \text{[Math. 5]}$$

The spectrum $R_0$ obtained by subtracting the noise spectrum N from the reference spectrum $I_0$ is input to the water vapor absorption peak frequency determination unit 250, and then processing of determining (selection processing) a frequency of an absorption peak due to water vapor is executed, and processing of storing the determined frequency is executed.

The water vapor absorption peak half-value width input unit 160 is a portion for inputting the full width at half maximum $\delta_w$ of the observed water vapor absorption peak. The difference interval calculation unit 165 calculates a difference interval $\delta$ (frequency interval) for computing a difference with respect to the spectrum $R_0$. As an example, the difference interval $\delta$ can be calculated based on the full width at half maximum $\delta_w$ of the water vapor absorption peak. For example, the difference interval $\delta$ can be calculated as an integer such that $\delta \times \Delta$ approximates the value of twice the full width at half maximum $\delta_w$. The threshold processing unit 180 determines whether the difference value is larger or smaller than the threshold value t, and stores a specific frequency in the frequency list storage unit 190 in accordance with the determination result. The details of the processing described above will be described below.

Next, the spectrum elimination and interpolation processing executed in the spectrum elimination and interpolation unit 260 will be described. As described above, all spectrum intensity values acquired at the frequencies stored in the frequency list storage unit 190 are discarded (eliminated) from the spectrum $R_0$ and the spectrum $R_1$ so as to be put into an uninput state. The discarded spectrum intensity values are restored by applying linear interpolation to spectrum intensity values at frequencies remaining before and after uninput portions (portions where data is eliminated). This enables restoration of a spectrum with reduced influence of water vapor.

Figure 2B:
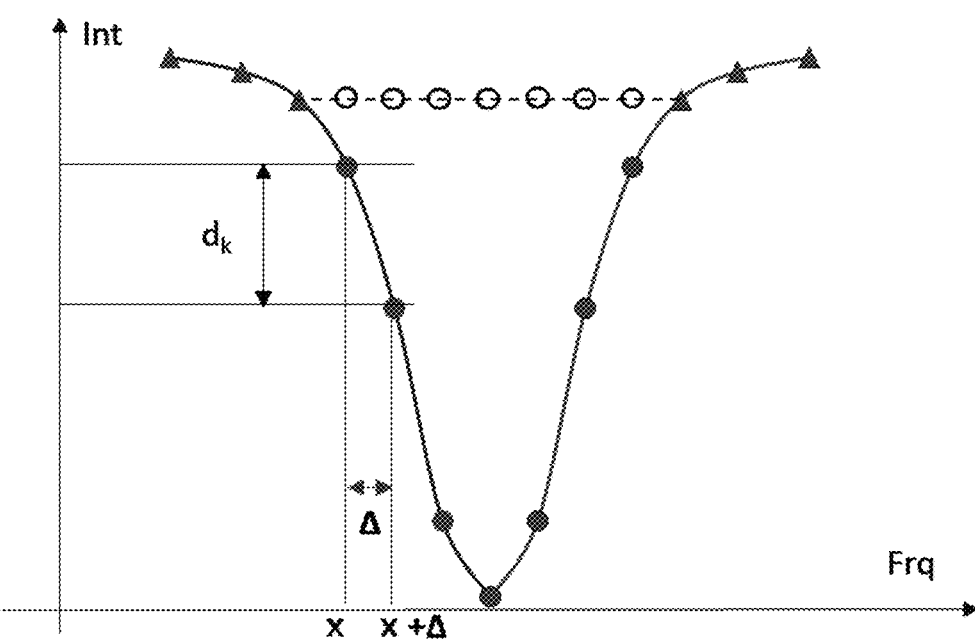
FIG. 2B is a conceptual diagram explaining a specific example of spectrum elimination and interpolation processing in a spectrum elimination and interpolation unit 260.

A specific example of this spectrum elimination and interpolation processing will be described with reference to FIG. 2B. In FIG. 2B, it is assumed that plots of black circles are spectrum intensity values acquired at the frequencies stored in the frequency list storage unit 190. As a result of determining that a difference value $d_k$ is greater than the threshold value t, it is determined that this portion corresponds to a spectrum frequency of water vapor. Thus, this frequency is stored in the frequency list storage unit 190. Consequently, the data of the intensity values of the plots of the black circles are discarded, and intensity values of remaining triangular plots are used for linear interpolation of the eliminated data to restore plots of white circles.

Next, the operation of the absorption spectrum computation unit 270 will be described. The absorption spectrum computation unit 270 includes an absorbance calculation unit 271 and a smoothing unit 275. The absorbance calculation unit 271 calculates an absorbance A (absorption spectrum) of a specimen to be measured in accordance with [Math. 6] below.

$$A = -\log_{10}(R_1/R_0) \qquad \text{[Math. 6]}$$

The smoothing unit 275 smooths a spectrum by using, for example, the Savitzky-Golay filter or a simple moving average method. A spectrum converted to an absorbance is denoted as an absorption spectrum of the specimen. By the above-described procedure, an absorption spectrum in which the influence of water vapor absorption is reduced from a spectrum acquired under the humid condition can be acquired from a spectrum output unit 280.

Figure 2C:
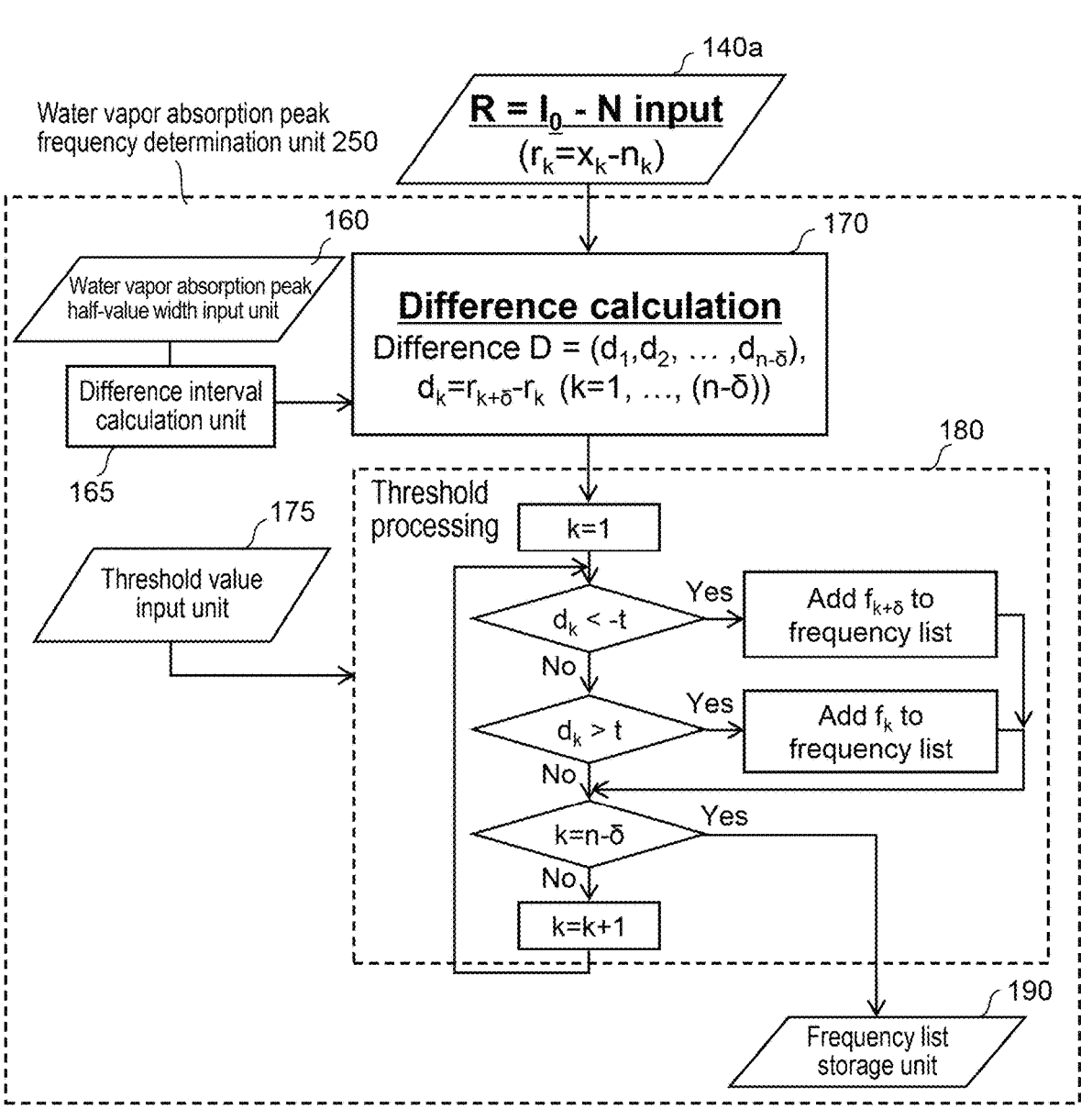
FIG. 2C is a block diagram illustrating a procedure of determination in a water vapor absorption peak frequency determination unit 250 of the far-infrared spectroscopic apparatus of the first embodiment.

An example of the processing by the water vapor absorption peak frequency determination unit 250 will be described in details with reference to FIG. 2C. In the difference calculation unit 170, a difference $d_k$ between a spectrum intensity value $r_{(k)}$ of the spectrum $R_0$ acquired at the k-th frequency and a spectrum intensity value $r_{(k+\delta)}$ of the $R_0$ acquired at the (k+δ)-th frequency is calculated as shown in [Math. 7].

$$d_k = r_{(k+\delta)} - r_{(k)} \qquad \text{[Math. 7]}$$

Here, as described above, the difference interval δ is determined by the difference interval calculation unit 165 based on the full width at half maximum δw input by the water vapor absorption peak half-value width input unit 160. The difference interval δ is desirably an approximate integer value such that δ×Δ corresponds to a frequency width of approximately twice $\delta_w$. Specifically, the difference interval δ can be defined as shown in [Math. 8] which is represented by the frequency interval Δ and an INT function (rounded down to the nearest integer).

$$\delta = \text{INT}\,(2\delta w/\Delta \,+\, 0.5) \quad (\text{where } \delta >= 1) \qquad \text{[Math. 8]}$$

The threshold value t (t>0) for determining a water vapor absorption peak frequency is input from a threshold value input unit 175. In the threshold processing unit 180, a magnitude relationship between the threshold value t and the difference dk is determined, and a water vapor absorption peak frequency is determined (selected) in accordance with the determination result. Specifically, after the threshold value t is input, the threshold processing unit 180 executes threshold value determination shown in [Math. 9] and [Math. 10]. By determining the threshold value t based on the minimum amount of attenuation that water vapor absorption causes on the spectrum $R_0$, a frequency at which water vapor absorption is observed can be extracted with high accuracy.

$$d_k > t \qquad \text{[Math. 9]}$$

$$d_k < -t \qquad \text{[Math. 10]}$$

When $d_k$ satisfies [Math. 9], the k-th frequency is determined to be a water vapor absorption peak frequency. On the other hand, when $d_k$ satisfies [Math. 10], the (k+δ)-th frequency is determined to be a water vapor absorption peak frequency. The frequency determined to be the water vapor absorption peak frequency is stored in the frequency list storage unit 190. This determination is repeated from k=1 to k=(n−δ).

In the far-infrared spectroscopic apparatus 100, the measurement frequency f is determined, and the measurement is performed while the measurement frequency f is increased from the measurement start frequency $f_1$ to the measurement end frequency, whereby the reference spectrum $I_0$, the specimen spectrum $I_1$, and the noise spectrum N can be acquired. The reference spectrum $I_0$, the specimen spectrum $I_1$, and the noise spectrum N can be acquired continuously at a certain fixed measurement frequency f. For this reason, the water vapor absorption peak frequency in the reference spectrum $I_0$ is coincident with the water vapor absorption peak frequency in the specimen spectrum $I_1$, and this is also true when a plurality of specimens are measured. Thus, the processing by the water vapor absorption peak frequency determination unit 250a needs to be performed only once for the set of measurement of the reference spectrum $I_0$ and measurement of the specimen spectrum $I_1$, without need for separately performing the processing for them.

Figure 3A:
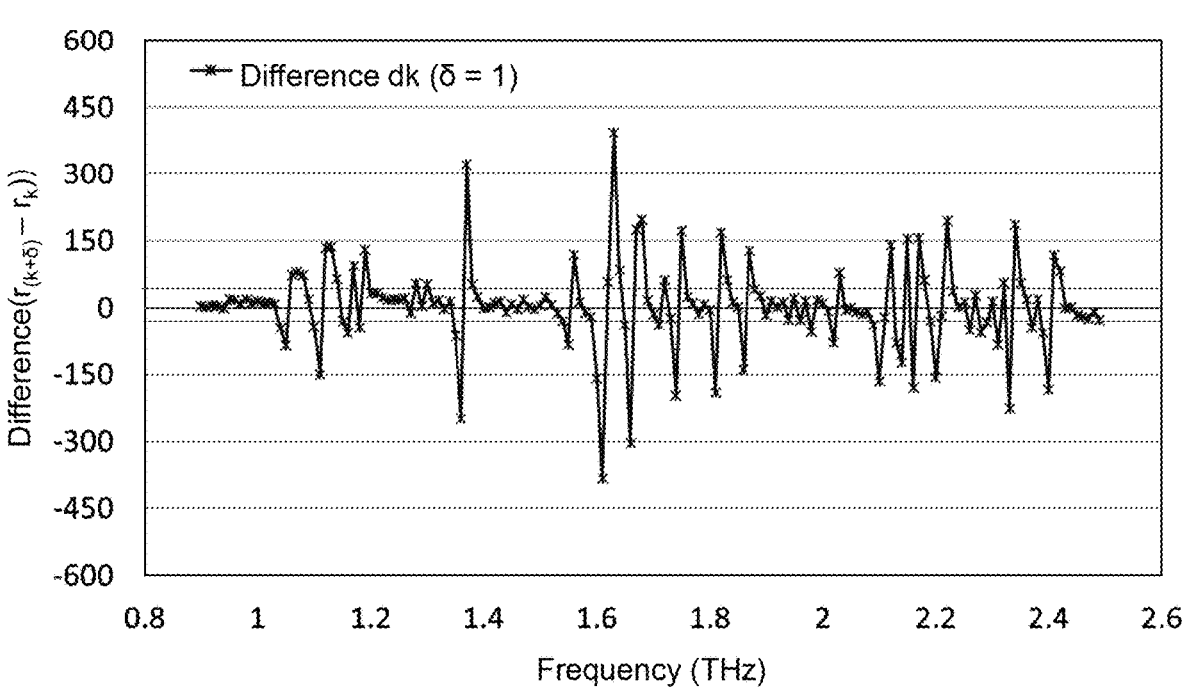
FIG. 3A is a graph explaining a specific example of determination of water vapor absorption peak frequencies by computation of a difference in a reference spectrum $dk=r_{(k+\delta)}-r_k$ and comparison with a threshold value t.
Figure 3B:
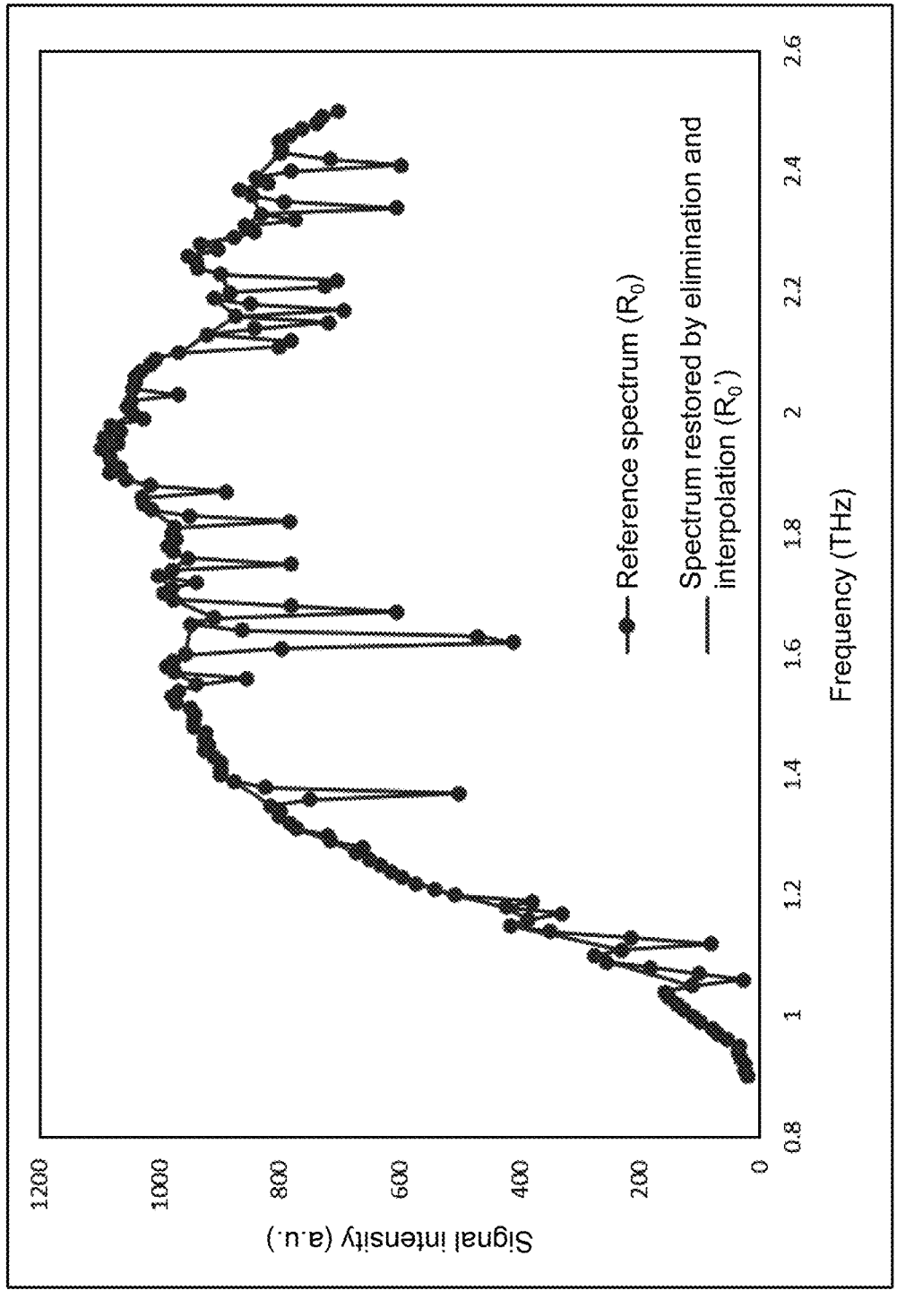
FIG. 3B is a graph illustrating an example of a reference spectrum obtained in moist air and a spectrum after performing elimination of water vapor absorption peaks and interpolation.

An example of the first embodiment is illustrated in FIGS. 3A and 3B. FIGS. 3A and 3B illustrate a case in which the measurement start frequency $f_1$ is set to 0.9 THz, the measurement end frequency $f_n$ is set to 2.5 THz, the frequency interval Δ is set to 10 GHz, and a reference spectrum, a specimen spectrum, and a noise spectrum composed of n=161 pieces of date are acquired. In addition, the difference interval δ is set to 1 (equivalent to 10 GHz) and the threshold value t is set to 50.

FIG. 3A is a graph in which the difference $D_k=r_{(k+\delta)}-r_{(k)}$ of the reference spectrum $I_0$ is plotted at each measurement frequency. In FIG. 3, lines of threshold values t=50 and −50 are indicated by straight lines. As a result of the threshold value determination, data acquired at 41 frequencies out of n=161 are subject to elimination and interpolation.

FIG. 3B illustrates an example of data (the spectrum $R_0$ in FIG. 2A and a spectrum $R'_0$ after the spectrum elimination and interpolation) before and after the operation of eliminating spectrum of the water vapor absorption peaks in accordance with the water vapor peak frequencies identified as illustrated in FIG. 3A. The reference spectrum $R_0'$ in which the influence of water vapor is reduced can be acquired by eliminating the spectrum attenuated by the influence of water vapor absorption and linearly interpolating the eliminated portion.

Although not illustrated, similarly, for the specimen spectrum $R_1$, a spectrum $R_1'$ in which absorption of water vapor is reduced can be acquired by eliminating the spectrum of water vapor absorption peaks and performing linear interpolation based on data acquired as illustrated in FIG. 3A.

Figure 4:
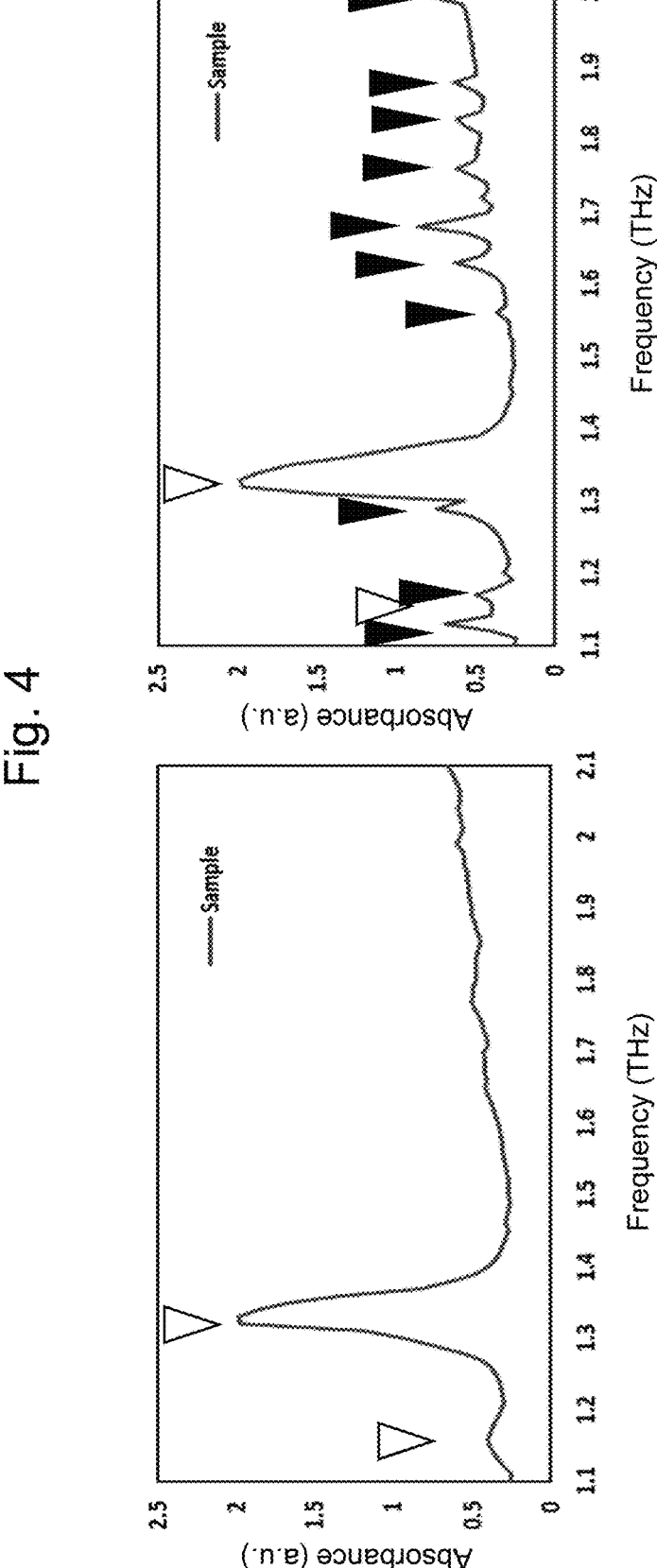
FIG. 4 is a graph illustrating an example of an absorption spectrum in which absorption peaks of water vapor and absorption peaks of a specimen are mixed and an absorption spectrum of the specimen obtained by reducing the influence of the absorption peaks of water vapor.
Figure 5:
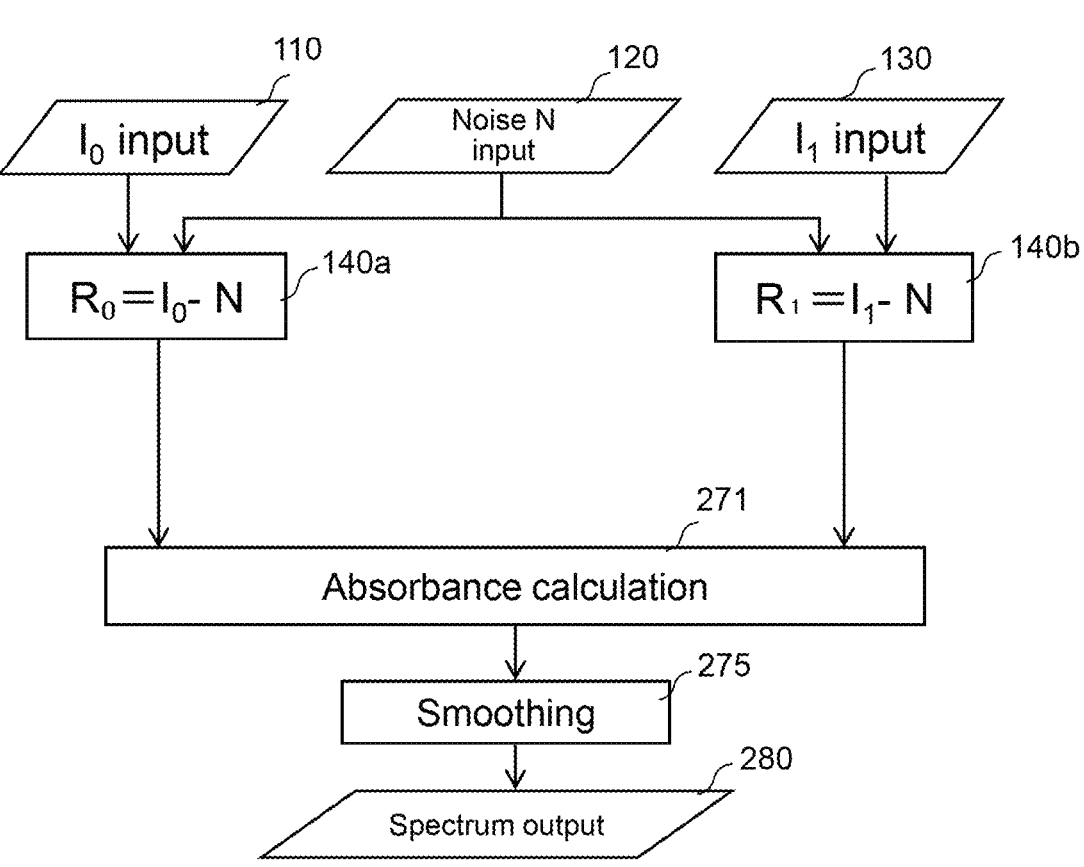
FIG. 5 is a block diagram of a comparison example.

The graph on the left side in FIG. 4 shows an example of the result of acquiring an absorption spectrum of the specimen using the spectra $R_0'$ and $R_1'$ in which the influence of absorption peaks of water vapor is reduced. In addition, the graph on the right side in FIG. 4 shows the spectrum of the same specimen output using the spectra $R_0$ and $R_1$ in which the influence of absorption peaks of water vapor remains. The procedure for outputting the spectrum of the graph on the right side in FIG. 4 is as shown in a Comparative Example of FIG. 5. Sharp absorption (represented by inverted triangles) appearing due to the influence of water vapor is reduced in the graph on the left side in FIG. 4, and the absorption derived from the specimen (represented by white inverted triangles) can be clearly observed.

The operation of the control unit 226 will be described in further detail. The control unit 226 controls a wavelength of a wavelength-tunable laser used in the light source 213 and generates a terahertz wave of an arbitrary frequency. In order to adjust the change in the optical axis of the seed light (horizontal direction on the paper surface of the drawing) along with the change in the wavelength, the angle (horizontal direction on the paper surface of the drawing) of the galvanometer mirror used as the optical element 214 is also controlled at the same time. In addition, the direction of the optical axis of the terahertz light generated from the nonlinear optical crystal 221a slightly changes (horizontal direction on the paper surface of the drawing) depending on the frequency. The control unit 226 controls the movable stage RM in response to the amount of the change in the direction (horizontal direction on the paper surface of the drawing) of the optical axis of the terahertz light. Accordingly, the specimen table ST can be arranged at an appropriate position for each measurement frequency. Further, when necessary, the control unit 226 can control the opening and closing of the dry air inflow control unit 228 to adjust the humidity in the chamber 229 to an appropriate humidity for the specimen.

Differences between absorption peaks of water vapor and absorption peaks of a specimen will be described. The full width at half maximum of absorption peaks of a solid specimen can be observed over a very wide frequency width as compared to absorption peaks of water vapor (in the embodiment, the full width at half maximum of the absorption peaks of water vapor is about 5 GHz, while the absorption of a solid specimen is about 50 GHZ). This broad absorption peak width is deemed to be derived from collective oscillations of a plurality of molecules in a solid specimen. Thus, by eliminating the absorption peaks of water vapor, a spectrum can be interpolated without significantly impairing the absorption peaks of the specimen.

Figure 6A:
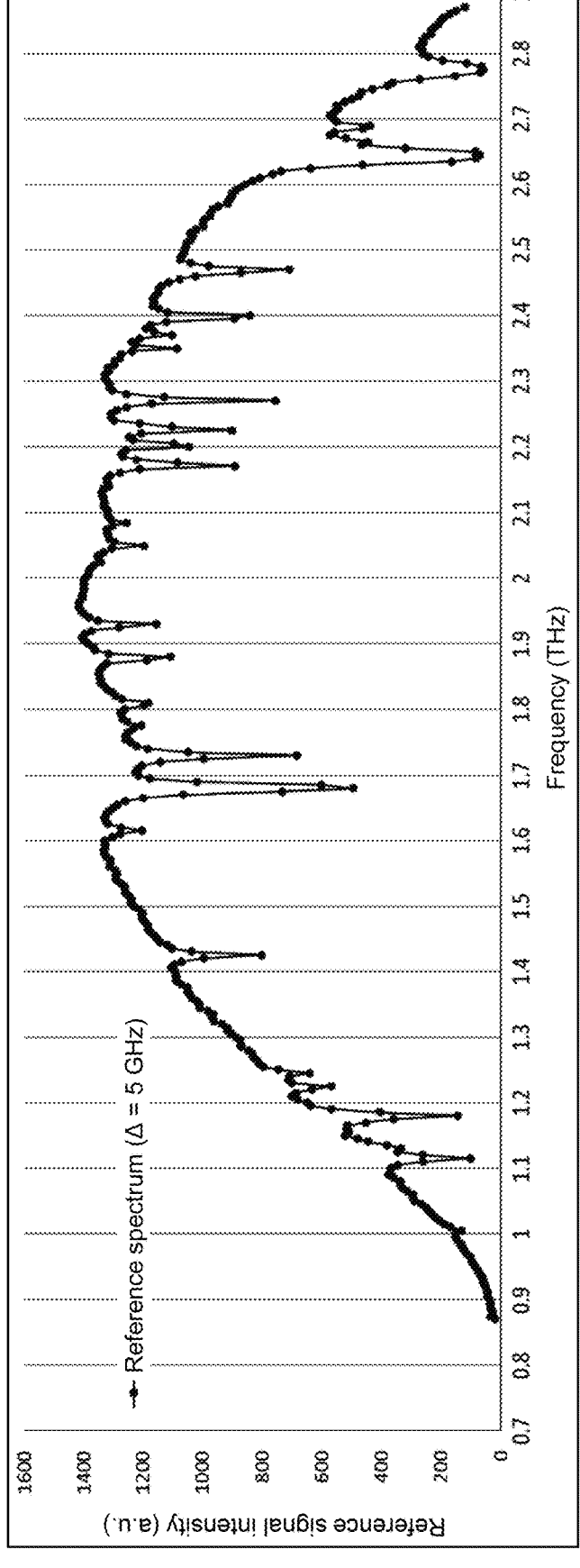
FIG. 6A is a graph illustrating an example of a reference spectrum acquired at Δ=5 GHZ.

Another specific application example of the first embodiment (FIG. 2A) will be described below. FIG. 6A illustrates an example of a reference spectrum composed of detection signal values of n=401 acquired under a humid condition with measurement conditions of the measurement start frequency $f_1$=0.87 THz, the measurement end frequency $f_n$=2.87 THz, and $\Delta$=5 GHZ. Each of the reference spectrum $I_0$, the specimen spectrum $I_1$, and the noise spectrum N is acquired in the above-described method, and the noise spectrum N is subtracted from the reference spectrum $I_0$ and the specimen spectrum $I_1$, thereby acquiring the spectra $R_0$ and $R_1$. Here, the observed full width at half maximum of the absorption peaks of water vapor is $\delta w$=0.005 THz, and thus $\delta$=2 is determined from [Math. 8] described above. In addition, the threshold value t=50 is set.

Figure 6B:
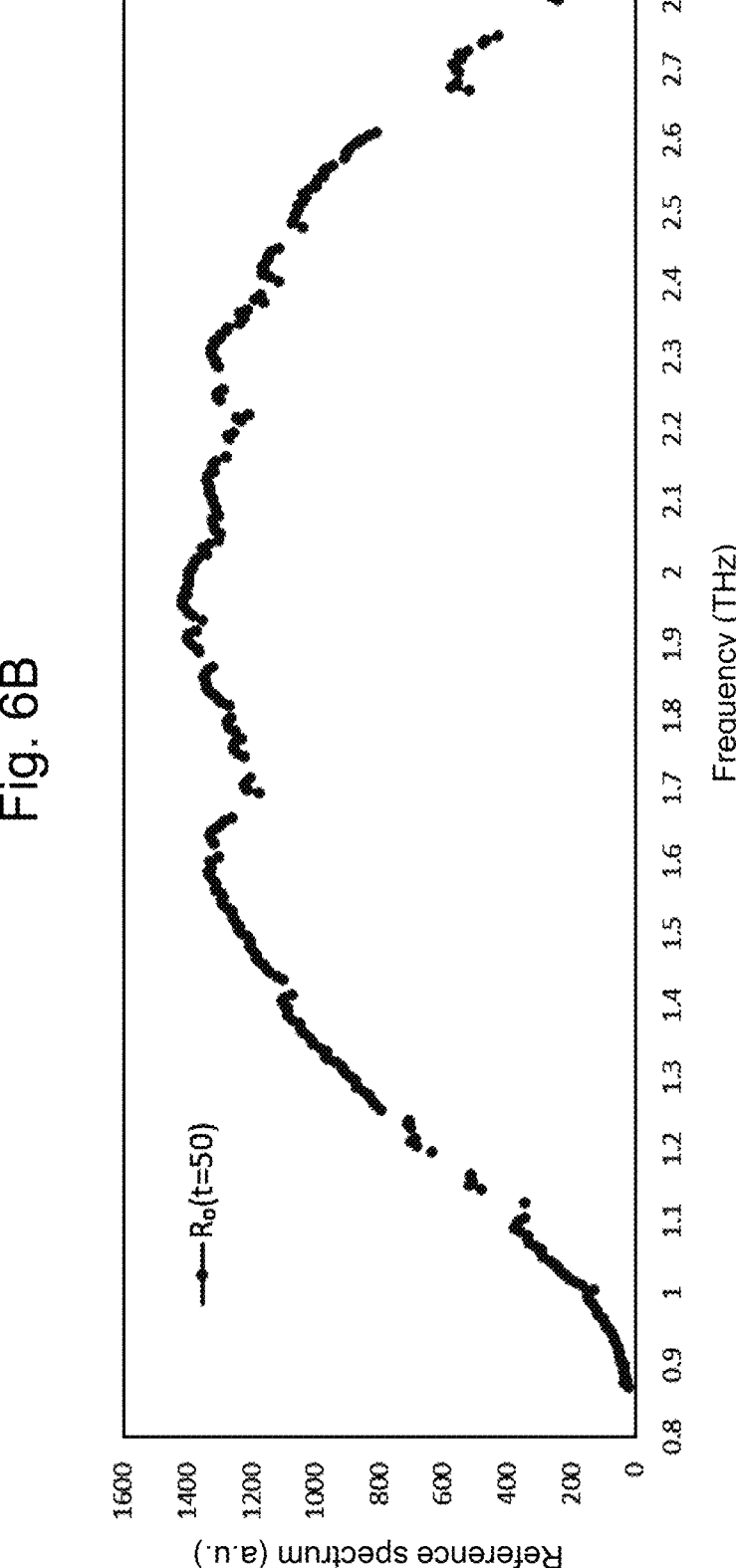
FIG. 6B is a graph illustrating an example of an absorption spectrum obtained by eliminating intensity values attenuated due to the influence of absorption peaks of water vapor from the reference spectrum of FIG. 6A.

FIG. 6A illustrates an example of the reference spectrum $R_0$ obtained under the above-described conditions. FIG. 6B illustrates an example of the spectrum $R_0$ in which the data at the frequencies stored in the frequency list storage unit 190 is excluded as a result of threshold determination. The frequencies affected by the absorption of water vapor can be accurately determined, indicating that the influence of the absorption peaks of water vapor can be effectively eliminated.

Figure 6C:
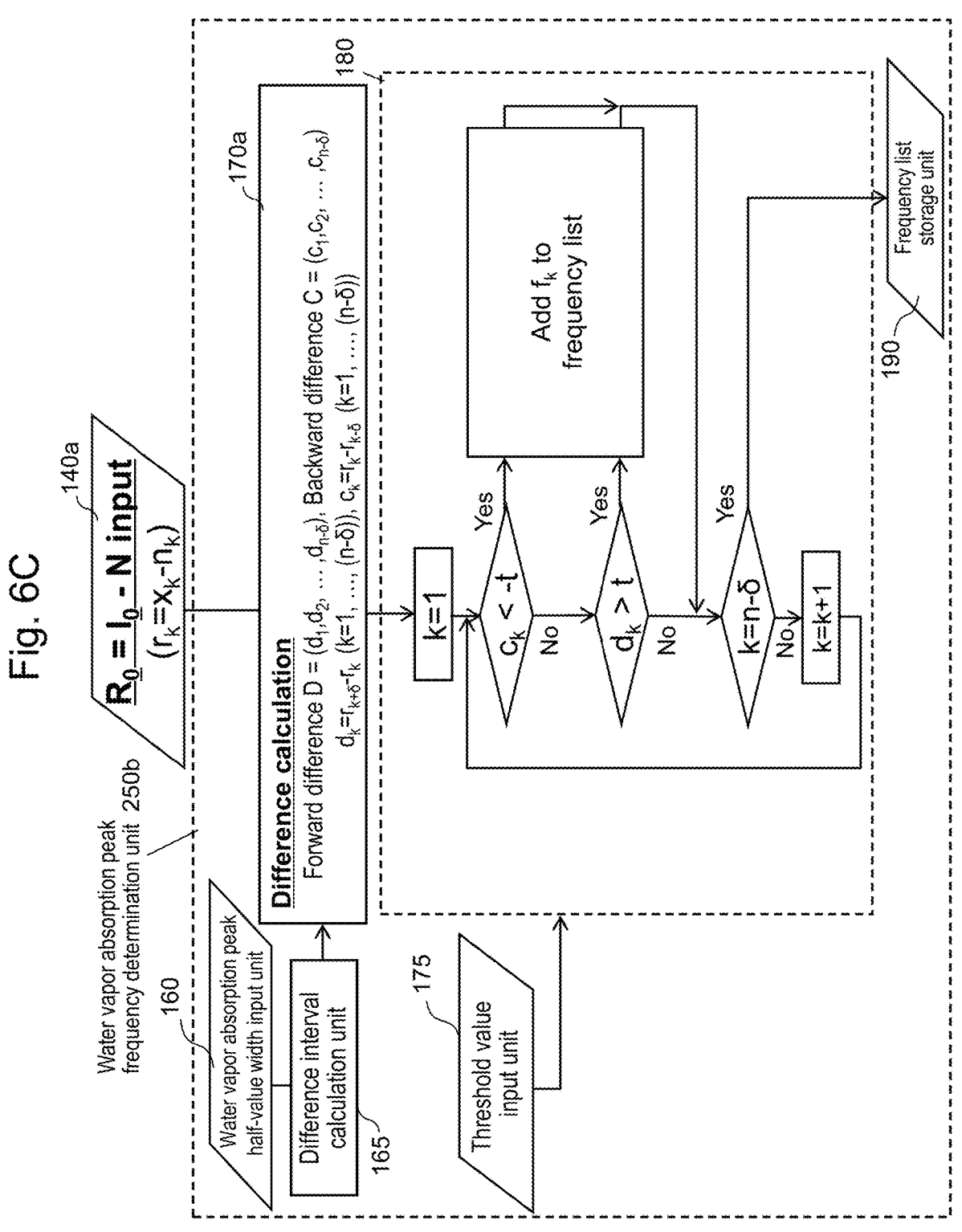
FIG. 6C is a block diagram illustrating a configuration example and a processing procedure of a water vapor absorption peak frequency determination unit 250b according to a modification example of the first embodiment.

FIG. 6C illustrates a modification example of the first embodiment. The water vapor absorption peak frequency determination unit 250 in FIG. 2A detects water vapor absorption peak frequencies by obtaining one difference $d_k$ and performing threshold determination. On the other hand, in the modification example illustrated in FIG. 6C, two differences are obtained and water vapor absorption peaks are detected in accordance with a result of threshold determination. Specifically, a difference $c_k$ shown in [Math. 11] below is acquired simultaneously with the difference $d_k$, and a water vapor absorption peak frequency determination unit 250b illustrated in FIG. 6C performs determination processing. Here, $d_k$ and $c_k$ are differences called and defined as a forward difference and a backward difference, respectively. In other words, in this modification example, the forward difference dx is computed as a difference between a signal intensity of the reference spectrum $R_0$ at one frequency and a signal intensity of the reference spectrum $R_0$ at a frequency greater by the interval $\Delta$ than the one frequency. In addition, the backward difference $c_k$ is computed as a difference between a signal intensity of the reference spectrum $R_0$ at one frequency and a signal intensity of the reference spectrum $R_0$ at a frequency smaller by the interval $\Delta$ than the one frequency. When the two differences $c_k$ and $d_k$ satisfy either one of two conditions of [Math. 12], a frequency $f_k$ at which a signal intensity $r_k$ is acquired is stored in the frequency list storage unit 190.

$$ck = r_{(k)} - r_{(k-\delta)} \qquad \text{[Math. 11]}$$

$$c_k < -t \text{ or } d_k > t \qquad \text{[Math. 12]}$$

Since $c_k$ and $d_{(k-\delta)}$ are the same calculation expression, when used at the same difference interval $\delta$, the same frequencies as in the example of FIG. 2A are stored in the frequency list storage unit 190. Thereafter, elimination and interpolation of the data acquired at this frequency in the same manner as described above can be performed in the same manner as described above.

As described above, according to the far-infrared spectroscopic apparatus of the first embodiment, it is possible to accurately measure an absorption spectrum derived from a specimen by effectively reducing absorption peaks due to water vapor even in moist air atmosphere with a small computing amount.

Second Embodiment

Next, a far-infrared spectroscopic apparatus according to a second embodiment will be described with reference to FIG. 7. The overall configuration of the apparatus is the same as the first embodiment, and thus duplicated descriptions will be omitted. The far-infrared spectroscopic apparatus of the second embodiment differs from the first embodiment in terms of the configuration of a water vapor absorption peak frequency determination unit 250c. According to the second embodiment, it is possible to effectively reduce the influence of absorption peaks of water vapor even in a frequency region where a detection light intensity of a reference spectrum is low. The intensity of light obtained by parametric generation shows a frequency dependence specific to a non-linear optical crystal used. Thus, it is assumed that there are a frequency band with a low detection light intensity and a frequency band with a high detection light intensity within a certain measurement frequency range.

The water vapor absorption peak frequency determination unit 250c of the second embodiment includes a difference calculation unit 171 and a threshold value input unit 179, in addition to the components of the water vapor absorption peak frequency determination unit 250 of the first embodiment. The difference calculation unit 171 computes, in addition to the difference $d_k$ and the threshold value t used in the first embodiment, a relative value difference $d_k'$ obtained by relativizing a difference itself using reference spectrum data as shown in [Math. 13]. The threshold value input unit 179 inputs a threshold value t' which is different from the threshold value t. In addition to detecting water absorption peak frequencies by comparing the difference $d_k$ with the threshold value t, the threshold processing unit 180 detects water absorption peak frequencies by comparing the relative value difference $d_k'$ with the threshold value t'. Accordingly, absorption peaks of water vapor can be detected even when a signal intensity fluctuates within a measurement frequency range. For example, the threshold value t'=0.25 can be set.

$$d_k' = d_k/r_k \qquad \text{[Math. 13]}$$

Figure 8:
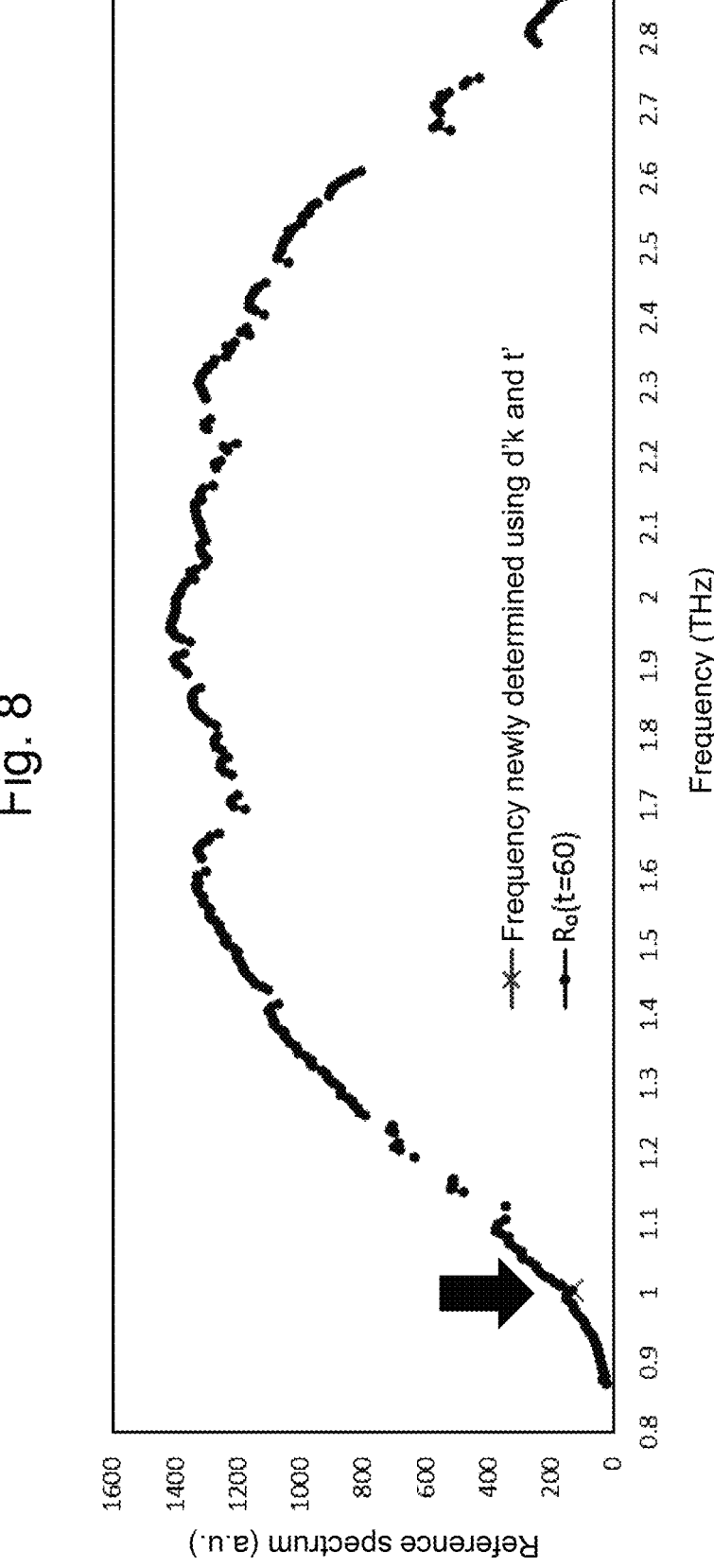
FIG. 8 is a graph illustrating a result of elimination of spectrum intensity values attenuated by absorption of water vapor based on the second embodiment.

Water vapor absorption peak frequencies determined only from the difference $d_k$ and the threshold value t correspond to the frequencies of the data eliminated in FIG. 6B. FIG. 8 illustrates frequency data newly stored in the frequency list storage unit 190 as a result of separately performing threshold determination using the relative value difference $d_k'$ and the threshold value t'. This indicates that a frequency of 1.005 THz at which the intensity of the reference spectrum is low and is attenuation due to absorption of water vapor is small determined using $d_k'$ and t'. It should be noted that, in the second embodiment, an example in which both the difference $d_k$ and the relative value difference $d_k'$ are used has been described, but a configuration in which water vapor absorption peak frequencies are detected using only the relative value difference $d_k'$ can be employed. It is possible to reduce the influence of water vapor absorption peaks in a frequency region where a detection light intensity of a reference spectrum is low even by using only the relative value difference $d_k'$, and in this case, such effect can be obtained by simpler processing.

A modification example of the second embodiment will be described below. In this modification example, as shown in [Math. 14] instead of [Math. 11], a ratio of spectrum signal intensities (signal intensity ratio) at different sampling points (for example, sampling points adjacent to each other) is calculated, and water vapor absorption peak frequencies are detected based on this signal intensity ratio $d_k''$.

Figure 7:
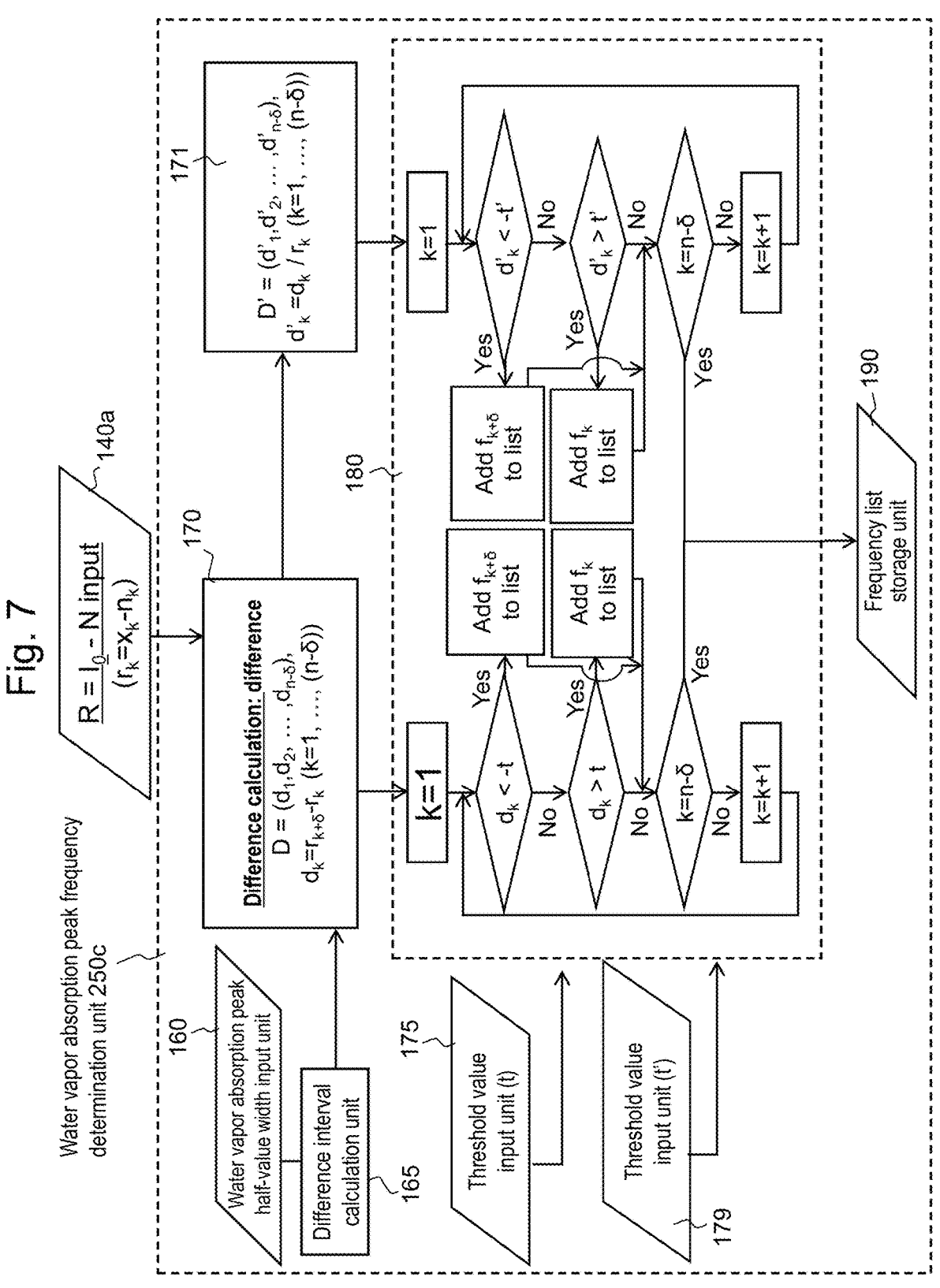
FIG. 7 is a block diagram illustrating processing by a water vapor absorption peak frequency determination unit 250c according to a second embodiment.

Specifically, the difference calculation unit 171 of FIG. 7 calculates a signal intensity ratio $d_k''$ of the reference spectrum in accordance with [Math. 14]. The expressions of threshold determination are defined as shown in [Math. 15] and [Math. 16]. The (k+8)-th frequency when [Math. 15] is satisfied and the k-th frequency when [Math. 16] is satisfied are stored in the frequency list storage unit 190. The subsequent procedure is the same as the second embodiment. According to the modification example, it is possible to effectively reduce the influence of absorption peaks of water vapor even in a frequency region where a detection light intensity of a reference spectrum is low. From the relationship between the relative value difference dk' and the signal intensity ratio $d_k''$ shown in [Math. 17], the modification example in which the signal intensity ratio $d_k''$ is used to determine water vapor absorption peak frequencies is equivalent to the case where the relative value difference dk' is used.

$$d_k'' = r_{k+\delta}/r_k \qquad \text{[Math. 14]}$$

$$d_k'' < 1 - t' \qquad \text{[Math. 15]}$$

$$d_k'' > 1 + t' \qquad \text{[Math. 16]}$$

$$D_k' = d_k/r_k = (r_{k+\delta} - r_k)/r_k = r_{k+\delta}/r_k - 1 = d_k'' - 1 \qquad \text{[Math. 17]}$$

It should be noted that, instead of the signal intensity ratio $d_k''$, a difference $d_{lnk}$ of the natural logarithm of $r_k$ can be used as shown in [Math. 18] below.

$$d_{lnk} = \ln(r_{k+\delta}) - \ln(r_k) = \ln(r_{k+\delta}/r_k) \qquad \text{[Math. 18]}$$

[Math. 18] is an expression in which a natural logarithm is used as the ratio in [Math. 14], and since the natural logarithm is a function whose slope can be approximated to 1 in the vicinity of 1, the threshold determination may be determination using [Math. 15] and [Math. 16]. That is, an effect substantially equivalent to the case where the threshold processing is performed on a relative value difference can be obtained.

Third Embodiment

Figure 9:
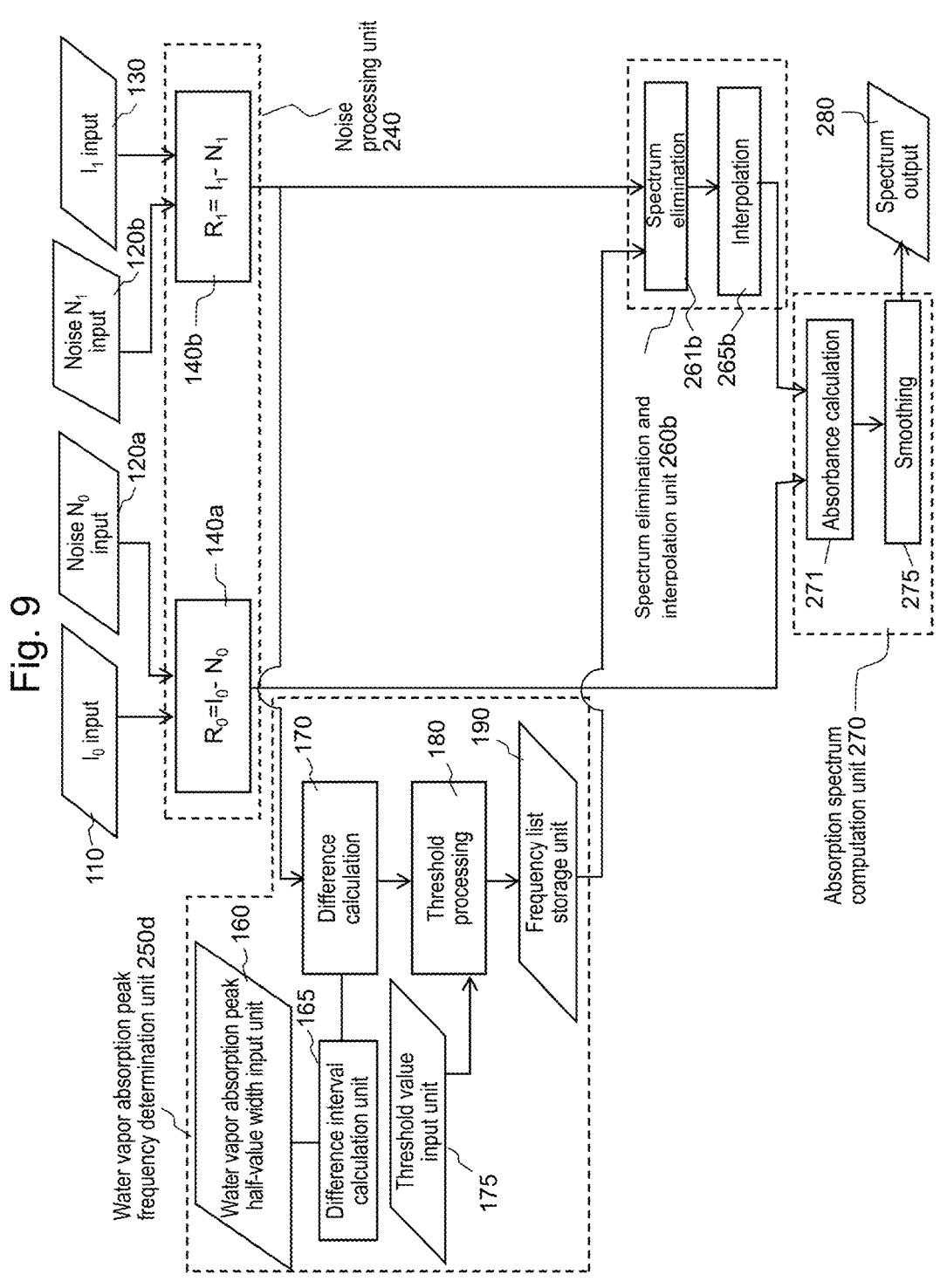
FIG. 9 is a diagram explaining processing of reducing the influence of absorption of water vapor from a specimen spectrum, the processing being executed in a far-infrared spectroscopic apparatus according to a third embodiment.

Next, a far-infrared spectroscopic apparatus according to a third embodiment will be described with reference to FIG. 9. The overall configuration of the apparatus is similar to the first embodiment, and thus duplicated descriptions will be omitted. The far-infrared spectroscopic apparatus of the third embodiment differs from the first embodiment in terms of the configuration of the noise processing unit 240 and a spectrum elimination and interpolation unit 260b.

While the water vapor absorption peak frequency determination unit 250 of the first embodiment acquires the reference spectrum $I_0$ and determines water vapor absorption peak frequencies for every measurement, this procedure is omitted in the third embodiment. In the spectrum elimination and interpolation unit 260*b*, the spectrum elimination unit 261*a* and the interpolation unit 265*a* for the reference spectrum $R_0$ are omitted, and the operation of data elimination and interpolation is performed only for the specimen spectrum $R_1$ in the spectrum elimination unit 261*b* and the interpolation unit 265*b*. That is, in the third embodiment, spectrum data affected by water vapor is eliminated from the specimen spectrum $R_1$ including absorption peaks of water vapor, and interpolation operation is performed. The specific procedure thereof will be described below with reference to FIG. 9.

In the third embodiment, the reference spectrum $I_0$ and the noise spectrum $N_0$ are acquired in dry air (dry condition) separately from the specimen spectrum $I_1$ which is a measurement result of a specimen to be measured, and input to the noise processing unit 240. In the measurement of the specimen to be measured, the specimen is placed on the specimen table ST in moist air, and the specimen spectrum $I_1$ and the noise spectrum $N_1$ are acquired in the same procedure as in the above-described embodiments.

It is desirable that the reference spectrum $I_0$ and the noise spectrum $N_0$ are n-th-order row vectors of the same order acquired at the same measurement start frequency, the same measurement end frequency, and the same frequency interval as those for the specimen spectrum $I_1$ and the noise spectrum $N_1$. However, the data satisfying the following conditions may be used.

When the reference spectrum $I_0$ and the noise spectrum $N_0$ are acquired at a measurement start frequency $f_1'$, a measurement end frequency $f_n'$, and a frequency interval $\Delta'$, the order n' as vector data of the specimen spectrum $I_0$ and the noise spectrum $N_0$ is determined as shown in [Math. 19] below. All the measurement frequencies of the reference spectrum $I_0$ and the noise spectrum $N_0$ are represented by $F'=(f_1', f_2', \ldots, f_n')$. When the order of the specimen spectrum $I_1$ and the noise spectrum $N_1$ as vector data is defined as m and all the measurement frequency are defined as a frequency sequence $F=(f_1, f_2, \ldots, f_m)$, the reference spectrum $I_0$ and the noise spectrum $N_0$ may be n'-order vector data acquired at a measurement frequency F' satisfying [Math. 20].

$$n' = 1 + (f_n' - f_1')/\Delta \qquad \text{[Math. 19]}$$

$$n' \geq m \text{ and } F' \ni F \qquad \text{[Math. 20]}$$

A water vapor absorption peak frequency determination unit 250*d* executes determination processing of water vapor absorption peak frequencies with respect to the spectrum $R_1$ obtained by subtracting the noise spectrum $N_1$ from the specimen spectrum $I_1$. The configuration of the water vapor absorption peak frequency determination unit 250*d* may be the same as the above-described embodiments.

In the third embodiment, it is not necessary to acquire a reference spectrum at the same time as a specimen spectrum, and the measurement time can be shortened as compared to the first and second embodiments. In addition, since the reference spectrum can be obtained in dry air, the data of the reference spectrum can be used as it is without via the water vapor absorption peak frequency determination unit 250*d*.

Fourth Embodiment

Next, a far-infrared spectroscopic apparatus according to a fourth embodiment will be described with reference to FIGS. 10 and 11. The overall configuration of the apparatus is similar to the first embodiment, and thus duplicated descriptions will be omitted. The far-infrared spectroscopic apparatus of the fourth embodiment differs from the first embodiment in terms of the configuration of a water vapor absorption peak frequency determination unit 250*e* and a spectrum data elimination and interpolation unit 260*c*.

In the fourth embodiment, first, the reference spectrum $I_0$, the noise spectrum Neo, the specimen spectrum $I_1$, and the noise spectrum Ni are acquired and input to the noise processing unit 240. Then, the noise processing unit 240 acquires the reference spectrum $R_0$ and the specimen spectrum $R_1$ in which the noise spectra $N_0$ and $N_1$ are eliminated, respectively. The absorbance calculation unit 271 calculates an absorption spectrum of the specimen from [Math. 6]. With respect to this absorption spectrum, the water vapor absorption peak frequency determination unit 250*e* determines absorption peak frequencies of water vapor. The spectrum elimination and interpolation unit 260*c* uses this determination result to perform processing of reducing absorption peaks of water vapor. It should be noted that, as in the third embodiment, the reference spectrum $I_0$ and the noise spectrum $N_0$ acquired in dry air may be used, and the specimen spectrum $I_1$ and the noise spectrum $N_1$ acquired in moist air may be used.

The details of the determination operation in the water vapor absorption peak frequency determination unit 250*e* of the fourth embodiment will be described with reference to FIG. 11. The water vapor absorption peak frequency determination unit 250*e* is configured to determine water vapor absorption peak frequencies by acquiring a difference in intensity values of an absorption spectrum of a specimen calculated based on the reference spectrum $R_0$ and the specimen spectrum $R_1$, and performing the same threshold determination as the above-described embodiments.

As shown in [Math. 8], the difference interval $\delta$ can be calculated based on the full width at half maximum $\delta_w$ of absorption peaks of water vapor observed, in the same manner as in the above-described embodiments.

When the intensity value of the absorption spectrum of the specimen acquired at the k-th frequency is represented as $a_k$, the difference calculation unit 171 calculates the difference $d_k$ between $a_{k+\delta}$ and $a_k$ as shown in [Math. 21]. The threshold processing unit 181 stores, in the frequency list storage unit 190, a frequency $f_{k+\delta}$ when the difference $d_k$ satisfies [Math. 9] and a frequency $f_k$ when the difference $d_k$ satisfies [Math. 10].

$$d_k = a_{(k+\delta)} - a_{(k)} \qquad \text{[Math. 21]}$$

Since the sign of the intensity value ak of the absorption spectrum to be input is opposite to the sign of the specimen spectrum $A_1$ (141*a* in FIG. 11), the combination of a frequency and a threshold determination expression stored (added) in the frequency list storage unit 190 is opposite to the combination in the threshold processing unit 180 of the first embodiment ($f_{k+\delta}$ is stored in the frequency list storage unit 190 when $d_k > t$, and fk is stored in the frequency list storage unit 190 when $d_k < -t$).

Figure 10:
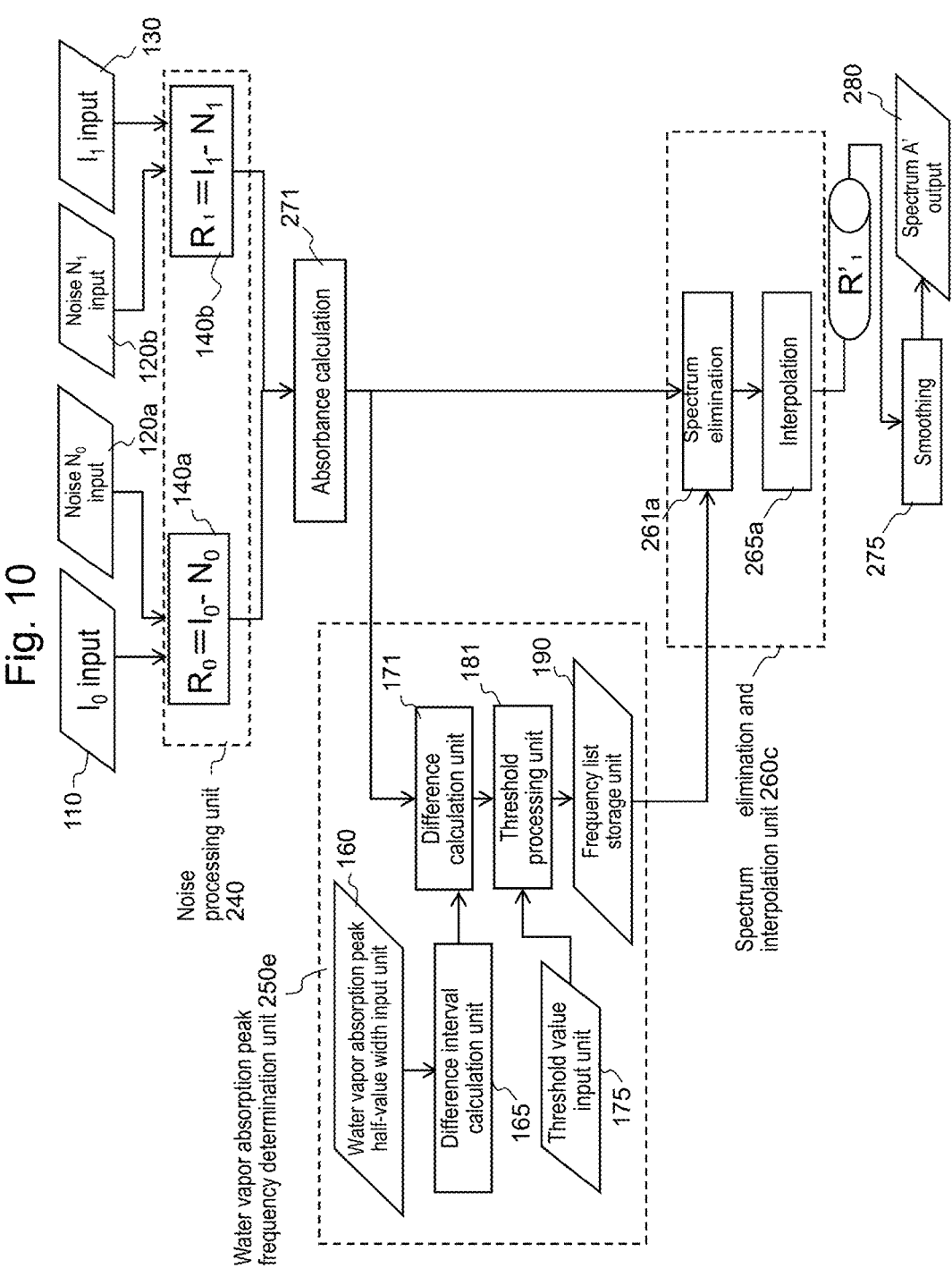
FIG. 10 is a diagram explaining a procedure to reduce the influence of absorption peaks of water vapor from an absorption spectrum of a specimen, the procedure being executed in a far-infrared spectroscopic apparatus according to a fourth embodiment.
Figure 11:
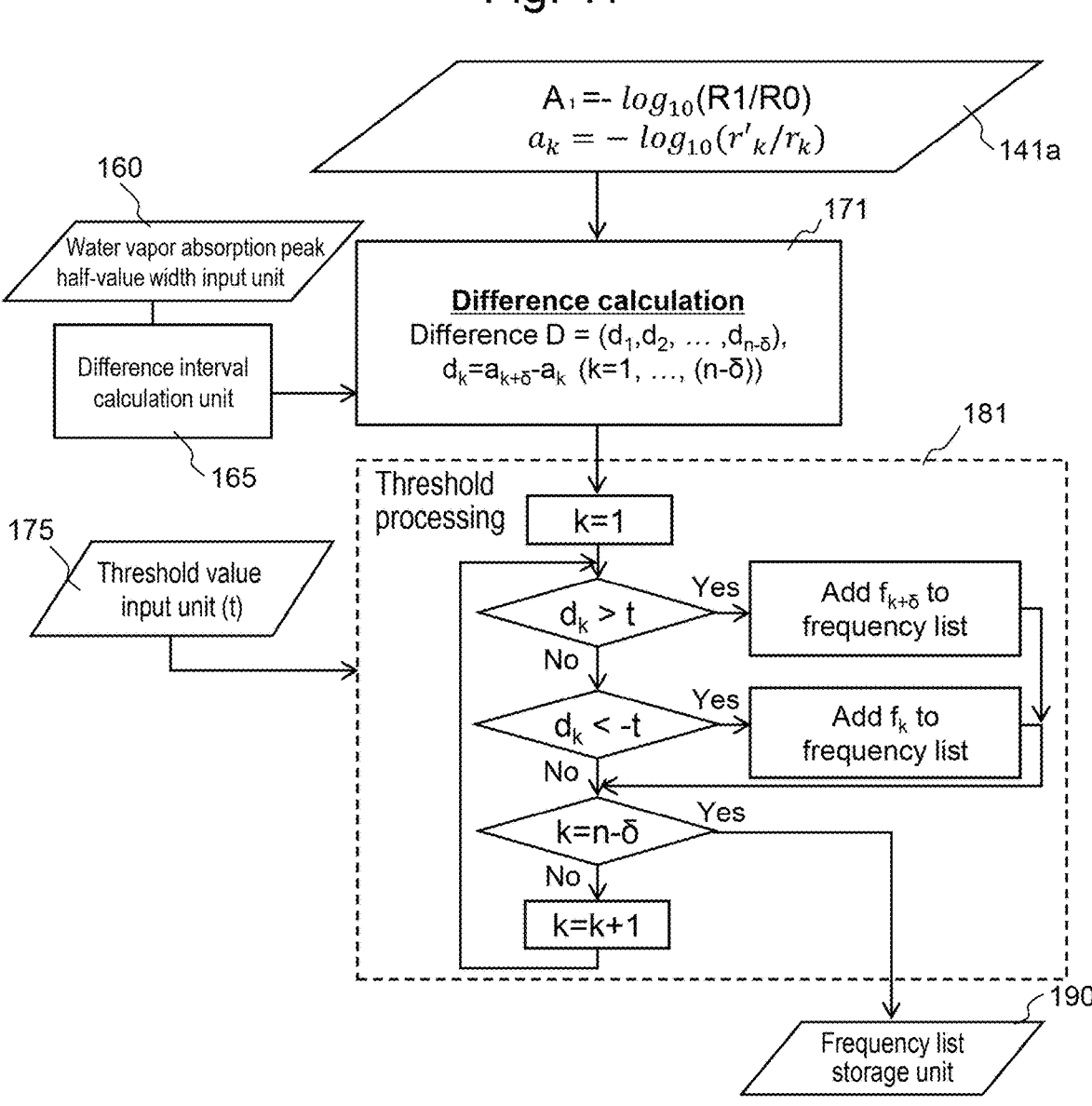
FIG. 11 is a diagram explaining the details of a water vapor absorption peak frequency determination unit 250d of the far-infrared spectroscopic apparatus of the fourth embodiment.

As illustrated in FIG. 10, the spectrum elimination unit 261*a* eliminates absorbance values acquired at the frequencies stored in the frequency list storage unit 190 from the absorption spectrum calculated by the absorbance calculation unit 271. The interpolation unit 265*a* restores the eliminated absorbance values by linearly interpolating absorbance values before and after the eliminated absorbance values. Further, when necessary, the smoothing unit 275 performs spectrum smoothing processing and outputs the absorption spectrum.

As described above, according to the apparatus of the fourth embodiment, the absorption spectrum A1' in which the influence of water vapor is reduced can be obtained by using only the absorption spectrum of the specimen.

In the fourth embodiment, since it is not necessary to acquire the reference spectrum Reg at the same time as the specimen spectrum R1, the measurement time can be shortened as compared to the first and second embodiments. In addition, since data with calculated absorbance is handled, it is possible to omit the input of a reference spectrum, a specimen spectrum, and a noise spectrum, and the processing of the noise processing unit 240. Further, since processing can be performed without using a reference spectrum, a specimen spectrum, and a noise spectrum, it is possible to reduce the influence of water vapor absorption peaks even when there is no such data.

The invention is not limited to the above-described embodiments, but includes various modification examples. For example, the above-described embodiments are described in detail so as to explain the invention in an easy-to-understand manner, and the invention is not necessarily limited to a configuration including all components described. In addition, a part of the configuration of a certain embodiment can be replaced with the configuration of another embodiment, and the configuration of a certain embodiment can be added to the configuration of another embodiment. Further, for a part of the configuration of each embodiment, the configuration of another embodiment can be added, deleted, or replaced.

REFERENCE SIGNS LIST

211: Near-infrared light source (pump light)
212: Polarization beam splitter
213: Near-infrared light source (seed light)
214, 215: Optical element
216: Mirror
221*a*: Non-linear optical crystal (terahertz light generator)
222*a*: Si prism (terahertz light generator)
221*b*: Non-linear optical crystal (detection light generator)
222*b*: Si prism (detection light generator)
223: Light guiding optical system
ST: Specimen table
RM: Movable stage
225: Near-infrared light detector
226: Control unit
227: Dry air supply unit
228: Dry air inflow control unit
229: Sealed chamber
230: Spectrum processing unit
240: Noise processing unit
250: Water vapor absorption peak frequency determination unit
260: Spectrum elimination and interpolation unit
270: Absorption spectrum computation unit

The invention claimed is:
1. A far-infrared spectroscopic apparatus comprising:
a holding mechanism configured to be capable of holding a specimen in moist air;
a detector configured to detect light obtained by emitting far-infrared light onto the specimen; and

a signal processing unit configured to compute an absorption spectrum of the specimen f from the detector,
characterized in that
the signal processing unit
acquires
a first spectrum detected by the detector when the far-infrared light is emitted along a measurement optical path while a wavelength of the far-infrared light is changed, without the specimen being on the measurement optical path, and
a second spectrum detected by the detector when the far-infrared light is emitted along the measurement optical path while the wavelength of the far-infrared light is changed, with the specimen being on the measurement optical path,
calculates a difference in any of the first spectrum, the second spectrum, or a spectrum obtained based on the first spectrum and the second spectrum, at frequency intervals determined in accordance with a width of absorption peaks due to water vapor,
selects frequencies of the absorption peaks due to water vapor in accordance with comparison between the difference and a threshold value, and
executes data elimination for a signal of the first spectrum, the second spectrum, or the spectrum obtained based on the first spectrum and the second spectrum, based on the frequencies selected.

2. The far-infrared spectroscopic apparatus according to claim 1, wherein the signal processing unit acquires a noise spectrum obtained by performing a measurement in a state in which the measurement optical path is shielded, performs subtraction of the noise spectrum from the first spectrum and the second spectrum, and executes the data elimination for the first spectrum or the second spectrum after the subtraction.

3. The far-infrared spectroscopic apparatus according to claim 1, wherein the signal processing unit is configured to restore data of a portion on which the data elimination has been performed, by performing interpolation based on remaining data before and after the portion on which the data elimination has been performed.

4. The far-infrared spectroscopic apparatus according to claim 1, wherein the signal processing unit is configured to acquire the first spectrum and the second spectrum by setting the measurement optical path in a humid condition, and selects the frequencies of absorption peaks due to water vapor based on a difference in the first spectrum.

5. The far-infrared spectroscopic apparatus according to claim 1, wherein the signal processing unit is configured to acquire the first spectrum by setting the measurement optical path in a dry condition, and select the frequencies of absorption peaks due to water vapor based on a difference in the second spectrum.

6. The far-infrared spectroscopic apparatus according to claim 1, wherein
the signal processing unit
calculates, as the difference
a forward difference which is a difference between a signal intensity of a spectrum at one frequency and a signal intensity of the spectrum at a frequency greater than the one frequency, and
a backward difference which is a difference between a spectrum signal intensity at one frequency and a spectrum signal intensity at a frequency smaller than the one frequency, and selects the frequencies of absorption peaks due to water vapor by comparing the forward difference and the backward difference with the threshold value.

7. The far-infrared spectroscopic apparatus according to claim 1, wherein the signal processing unit is configured to select the frequencies of absorption peaks due to water vapor by using, as the difference, a difference obtained by relativizing the signal of the spectrum with a signal value of the spectrum.

8. The far-infrared spectroscopic apparatus according to claim 1, wherein the signal processing unit is configured to select the frequencies of absorption peaks due to water vapor based on a difference in the spectrum obtained based on the first spectrum and the second spectrum.

9. The far-infrared spectroscopic apparatus according to claim 1, further comprising a dry air supply unit configured to supply dry air into a specimen chamber containing the specimen, and a dry air inflow control unit configured to control inflow of the dry air.

10. A far-infrared spectroscopic method comprising:
acquiring
a first spectrum detected by a detector when far-infrared light is emitted along a measurement optical path while a wavelength of the far-infrared light is changed, without a specimen being on the measurement optical path, and
a second spectrum detected by the detector when the far-infrared light is emitted along the measurement optical path while the wavelength of the far-infrared light is changed, with the specimen being on the measurement optical path;

calculating a difference in any of the first spectrum, the second spectrum, or a spectrum obtained based on the first spectrum and the second spectrum at frequency intervals determined in accordance with a width of absorption peaks due to water vapor;

selecting frequencies of absorption peaks due to water vapor in accordance with comparison between the difference and a threshold value; and executing data elimination for a signal of the first spectrum, the second spectrum, or the spectrum obtained based on the first spectrum and the second spectrum, based on the frequencies selected.

11. The far-infrared spectroscopic method according to claim 10, further comprising acquiring a noise spectrum obtained by performing a measurement in a state in which the measurement optical path is shielded, subtracting the noise spectrum from the first spectrum and the second spectrum, and executing the data elimination for the first spectrum and the second spectrum after the subtracting.

12. The far-infrared spectroscopic method according to claim 10, further comprising restoring data of a portion on which the data elimination has been executed, by performing interpolation based on remaining data before and after the portion on which the data elimination has been executed.

* * * * *